US012577444B2

(12) United States Patent
Naito et al.

(10) Patent No.: US 12,577,444 B2
(45) Date of Patent: Mar. 17, 2026

(54) POLYMER COMPOUND, METHOD FOR PRODUCING POLYMER COMPOUND, ADHESIVE COMPOSITION, CURED PRODUCT, METHOD FOR PRODUCING ADHESIVE COMPOSITION, AND METHOD FOR ADJUSTING ADHESION FORCE

(71) Applicant: NATIONAL INSTITUTE FOR MATERIALS SCIENCE, Ibaraki (JP)

(72) Inventors: Masanobu Naito, Ibaraki (JP); Siqian Wang, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 861 days.

(21) Appl. No.: 17/796,757

(22) PCT Filed: Feb. 4, 2021

(86) PCT No.: PCT/JP2021/004170
§ 371 (c)(1),
(2) Date: Aug. 1, 2022

(87) PCT Pub. No.: WO2021/157668
PCT Pub. Date: Aug. 12, 2021

(65) Prior Publication Data

US 2023/0101138 A1 Mar. 30, 2023

(30) Foreign Application Priority Data

Feb. 7, 2020 (JP) ................................ 2020-019311

(51) Int. Cl.
*C09J 133/14* (2006.01)
*C08F 220/14* (2006.01)
(Continued)

(52) U.S. Cl.
CPC .......... *C09J 133/14* (2013.01); *C08F 220/14* (2013.01); *C08F 220/1808* (2020.02);
(Continued)

(58) Field of Classification Search
CPC . C09J 133/14; C09J 4/06; C09J 133/12; C09J 133/10; C09J 2433/00;
(Continued)

(56) References Cited

U.S. PATENT DOCUMENTS

2013/0323521 A1 12/2013 Xia et al.
2020/0004087 A1* 1/2020 Nozoe .................. C08F 220/32

FOREIGN PATENT DOCUMENTS

CN 101812182 8/2010
JP 2012-107198 6/2012
(Continued)

OTHER PUBLICATIONS

International Search Report (ISR) issued Apr. 13, 2021 in International (PCT) Application No. PCT/JP2021/004170.

*Primary Examiner* — Scott R. Walshon
(74) *Attorney, Agent, or Firm* — Wenderoth, Lind & Ponack, L.L.P.

(57) ABSTRACT

Provided is a polymer compound having a repeating unit represented by Formula 1A below:

(1A)

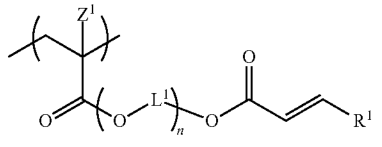

(1B)

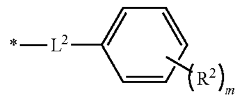

wherein in Formula 1A, $Z^1$ represents a hydrogen atom or a monovalent group, $R^1$ represents a group represented by Formula 1B, $L^1$ represents a divalent group, n represents an integer of 1 or more, and in in Formula 1B, $L^2$ represents a single bond or a divalent group, $R^2$ represents a group selected from the group consisting of a hydroxy group and a group represented by *—$OR^3$, $R^3$ represents a hydrocarbon group which may have a hetero atom, a plurality of $R^3$'s may be bonded to each other to form a ring, * represents a bonding position, m represents an integer of 1 to 5, and a plurality of $L^1$'s and a plurality of $R^2$'s may be the same as or different from each other.

16 Claims, 21 Drawing Sheets

(51) Int. Cl.
*C08F 220/18* (2006.01)
*C08F 220/30* (2006.01)
*C09J 4/06* (2006.01)
*C09J 133/12* (2006.01)

(52) U.S. Cl.
CPC ............. *C08F 220/303* (2020.02); *C09J 4/06* (2013.01); *C09J 133/12* (2013.01); *C09J 2301/416* (2020.08); *C09J 2433/00* (2013.01)

(58) Field of Classification Search
CPC .............. C09J 2301/416; C08F 220/14; C08F 220/1808; C08F 220/303; C08F 220/1802; C08F 220/1803; C08F 220/1804; C08F 220/1805; C08F 220/1806; C08F 220/1811; C08F 220/302
See application file for complete search history.

(56) References Cited

FOREIGN PATENT DOCUMENTS

| | | | |
|---|---|---|---|
| WO | 94/00797 | 1/1994 | |
| WO | WO-2018173727 A1 * | 9/2018 | ....... G02F 1/133788 |

* cited by examiner

Compress method

POLYMER COMPOUND, METHOD FOR PRODUCING POLYMER COMPOUND, ADHESIVE COMPOSITION, CURED PRODUCT, METHOD FOR PRODUCING ADHESIVE COMPOSITION, AND METHOD FOR ADJUSTING ADHESION FORCE

TECHNICAL FIELD

The present invention relates to a polymer compound, a method for producing a polymer compound, an adhesive composition, a cured product, a method for producing an adhesive composition, and a method for adjusting an adhesion force.

BACKGROUND ART

An adhesive composition using an acrylic polymer or a methacrylic polymer has been known. As such an adhesive composition, Patent Literature 1 describes "an adhesive composition containing: an alkyl (meth)acrylate ester in which the alkyl group has 4 to 18 carbon atoms; a hydrophilic copolymerizable monomer; and a free-radical generating initiator, in which the adhesive composition maintains a tan delta value of about 0.5 to about 1.0 at a temperature of about 25° C. to about 100° C.".

CITATION LIST

Patent Literature

Patent Literature 1: JP 2017-125195 A

SUMMARY OF INVENTION

Technical Problem

An object of the present invention is to provide a polymer compound with which an adhesive composition having excellent adhesiveness is obtained (hereinafter, simply referred to as "having the effect of the present invention") when applied to the adhesive composition. Another object of the present invention is to provide a method for producing a polymer compound, an adhesive composition, a cured product, a method for producing an adhesive composition, and a method for adjusting an adhesion force.

Solution to Problem

The present inventors have conducted intensive studies to achieve the above objects, and as a result, have found that the above objects can be achieved by the following configuration.

[1] A polymer compound having a repeating unit represented by Formula 1A below.

[2] The polymer compound described in [1], in which the group represented by Formula 1B below is a group represented by Formula 1B' below.

[3] The polymer compound described in [1] or [2], in which $L^1$ in Formula 1A below is a linear or branched alkylene group having 1 to 20 carbon atoms.

[4] The polymer compound described in any one of [1] to [3], in which $L^1$ in Formula 1A below is a linear alkylene group having 1 to 6 carbon atoms.

[5] The polymer compound described in any one of [1] to [4], in which n in Formula 1A below is 1.

[6] The polymer compound described in any one of [1] to [5], in which $Z^1$ in Formula 1A below is a hydrogen atom.

[7] The polymer compound described in any one of [1] to [6], in which the group represented by Formula 1B below is at least one group selected from the group consisting of groups represented by Formulas 2a to 2g below when * is a bonding position.

[8] The polymer compound described in any one of [1] to [7], further having a repeating unit represented by Formula 2 below.

[9] The polymer compound described in [8], in which $Z^2$ in Formula 2 below is a methyl group.

[10] The polymer compound described in [8] or [9], in which $R^4$ in Formula 2 below is a linear or branched alkyl group having 1 to 10 carbon atoms.

[11] The polymer compound described in any one of [1] to [10], in which a content of the repeating unit represented by Formula 1A below is 30 mol % or less when a content of all repeating units of the polymer compound is regarded as 100 mol %.

[12] A method for producing the polymer compound described in any one of [1] to [11], the method including: synthesizing a monomer A represented by Formula 5 below by an esterification reaction between a compound represented by Formula 3 below and a hydroxy group-containing (meth)acrylate compound represented by Formula 4 below; and polymerizing the monomer A to obtain the polymer compound.

[13] The method for producing the polymer compound described in [12], in which the compound represented by Formula 3 below is at least one compound selected from the group consisting of coumaric acid, caffeic acid, 2,5-dihydroxycinnamic acid, 3,5-dihydroxycinnamic acid, sinapinic acid, ferulic acid, 2,3-dihydroxycinnamic acid, and derivatives thereof.

[14] A method for producing the polymer compound described in [2], the method including: synthesizing a monomer B represented by Formula 5' below by an esterification reaction between a compound represented by Formula 3' below and a hydroxy group-containing (meth)acrylate compound represented by Formula 4' below; reacting the hydroxy group of the monomer B with a protecting agent to synthesize a monomer C represented by Formula 6' below having the protected hydroxy group; polymerizing the monomer C to synthesize a polymer compound precursor represented by Formula 7' below; and deprotecting the protected hydroxy group of the polymer compound precursor to obtain the polymer compound.

[15] The method for producing the polymer compound described in [14], in which the compound represented by Formula 3' below is at least one compound selected from the group consisting of coumaric acid, caffeic acid, 2,5-dihydroxycinnamic acid, 3,5-dihydroxycinnamic acid, sinapinic acid, ferulic acid, 2,3-dihydroxycinnamic acid, and derivatives thereof.

[16] The method for producing the polymer compound described in [14] or [15], in which the protecting group is at least one selected from the group consisting of an ether-based protecting group, a silyl ether-based protecting group, an ester-based protecting group, a carbonate-based protecting group, a carbamate-based protecting group, a phosphinate-based protecting group, and a sulfonate-based protecting group.

[17] The method for producing the polymer compound described in any one of [14] to [16], in which the protecting group is a carbonate-based protecting group.

[18] The method for producing the polymer compound described in [14], in which the protecting agent is di-tert-butyl pyrocarbonate.

[19] A dimer containing two of the polymer compound described in any one of [1] to [11], in which the two polymer compounds are bonded to each other by cleavage of a double bond adjacent to $R^1$ in Formula 1A above.

[20] An adhesive composition containing the polymer compound described in any one of [1] to [11]. [21] An adhesive composition containing: a monomer containing the polymer compound described in any one of [1] to [11]; and the dimer described in [19].

[22] The adhesive composition described in [21], in which a cross-linking density is 10000 to 20000 $mol/cm^3$.

[23] The adhesive composition described in [20], in which a cross-linking density increases in the case of irradiation with ultraviolet rays of 300 to 700 nm, and a cross-linking density decreases in the case of ultraviolet rays of 200 to 300 nm after the irradiation with ultraviolet rays of 300 to 700 nm.

[24] The adhesive composition described in [23], in which the cross-linking density in the case of irradiation with ultraviolet rays of 200 to 300 nm is 30% or less with respect to the cross-linking density in the case of irradiation with ultraviolet rays of 300 to 700 nm.

[25] The adhesive composition described in [23], in which the cross-linking density in the case of irradiation with ultraviolet rays of 300 to 700 nm is 10000 to 20000 $mol/cm^3$, and the cross-linking density in the case of irradiation with ultraviolet rays of 200 to 300 nm is 3000 to 6000 $mol/cm^3$.

[26] A cured product obtained by curing the adhesive composition described in any one of [20] to [25].

[27] A method for producing the adhesive composition described in [21], the method including a step of irradiating the adhesive composition described in [20] with ultraviolet rays.

[28] A method for adjusting an adhesion force, the method including a step of irradiating the adhesive composition described in [20] with ultraviolet rays once or more.

Advantageous Effects of Invention

According to the polymer compound of the present invention, when the polymer compound is applied to an adhesive composition, an adhesive composition having excellent adhesiveness and a cured product thereof are obtained. According to the method for producing the polymer compound of the present invention, it is possible to produce the above-described polymer compound and the like.

According to the dimer of the present invention, when the dimer is applied to an adhesive composition, an adhesive composition having more excellent adhesiveness and a cured product thereof are obtained. The adhesion strength of the adhesive composition of the present invention can be adjusted by irradiation with ultraviolet rays.

According to the method for adjusting an adhesion force of the present invention, by including the step of irradiating the adhesive composition with ultraviolet rays once or more, it is possible to reversibly adjust an adhesion strength.

DESCRIPTION OF EMBODIMENTS

Figure 1:
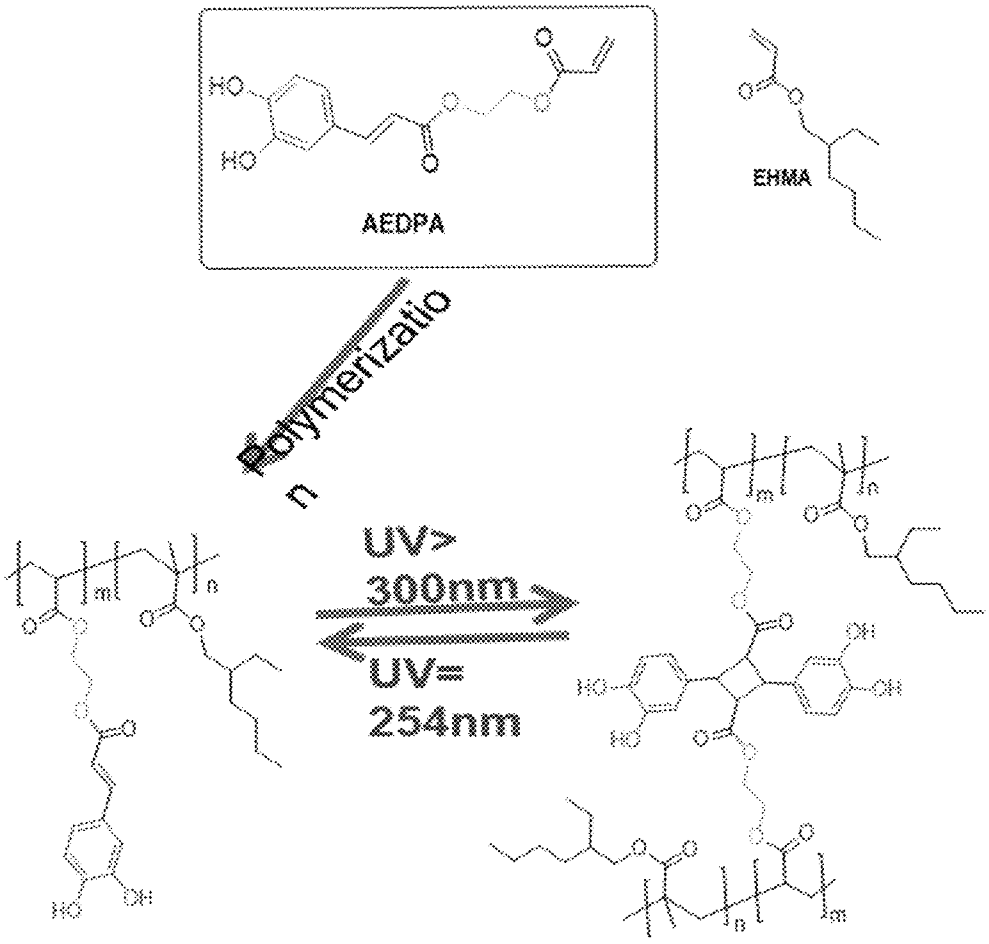
FIG. 1 is a schematic view illustrating a step of forming a dimer of the present invention using Poly(AEDPA-co-EHMA) as an example.

Hereinafter, the present invention will be described in detail.

The description of configuration requirements described below may be based on typical embodiments of the present invention; however, the present invention is not intended to be limited by such embodiments. In the specification, a numerical range expressed by using "to" means a range including numerical values described before and after "to" as a lower limit value and an upper limit value.

In the notation of the group (atomic group) in the present specification, notation not describing substitution and non-substitution also includes those having a substituent as well as those having no substituent as long as the effect of the present invention is not impaired. For example, the term "alkyl group" includes not only an alkyl group having no substituent (unsubstituted alkyl group) but also an alkyl group having a substituent (substituted alkyl group). This also has the same meaning for each compound.

In the present specification, the term "(meth)acrylate" indicates either or both of acrylate and methacrylate, and the term "(meth)acryl" indicates either or both of acryl and methacryl. The term "(meth)acryloyl" indicates either or both of acryloyl and methacryloyl.

[Polymer Compound]

A polymer compound according to an embodiment of the present invention (hereinafter, also referred to as "the present polymer compound") has a repeating unit represented by Formula 1A below (hereinafter, also referred to as "unit 1A").

[Chemical Formula 1]

(1A)

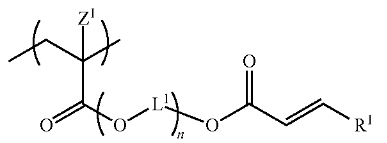

-continued (1B)

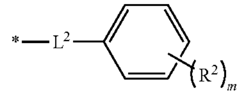

In Formula 1A, $Z^1$ represents a hydrogen atom or a monovalent group, and the monovalent group is not particularly limited, but is preferably a hydrocarbon group having 1 to 20 carbon atoms which may have a hetero atom (for example, a nitrogen atom, an oxygen atom, a sulfur atom, a selenium atom, or the like; hereinafter, the same applies in the present specification), more preferably an alkyl group having 1 to 20 carbon atoms, and further preferably an alkyl group having 1 to 10 carbon atoms.

Among them, $Z^1$ is preferably a hydrogen atom or an alkyl group having 1 to 5 carbon atoms, more preferably a hydrogen atom, a methyl group, or an ethyl group, and further preferably a hydrogen atom.

In Formula 1A, $L^1$ represents a divalent group, and the divalent group is not particularly limited, but examples thereof include —C(O)—, —S—, —$NR_x$— ($R_x$ represents a hydrogen atom or a monovalent organic group), an alkylene group (preferably having 1 to 20 carbon atoms), a cycloalkylene group (preferably having 3 to 20 carbon atoms), an alkenylene group (preferably having 2 to 20 carbon atoms), combinations thereof, and combinations of these with a group selected from the group consisting of —C(O)O—, —OC(O)—, and —O—, and the divalent group is preferably a linear alkylene group having 1 to 20 carbon atoms or a branched alkylene group having 1 to 20 carbon atoms, and more preferably a linear alkylene group having 1 to 6 carbon atoms.

In Formula 1A, n represents an integer of 1 or more, and the upper limit is not particularly limited, but is preferably 50 or less, more preferably 20 or less, and further preferably 10 or less, and n is particularly preferably 1.

In Formula 1A, $R^1$ is a group represented by Formula 1B, and in Formula 1B, $L^2$ represents a single bond or a divalent group. The divalent group is not particularly limited, and examples thereof include —C(O)—, —C(O)O—, —OC(O)—, —O—, —S—, —$NR_x$— ($R_x$ represents a hydrogen atom or a monovalent organic group), an alkylene group (preferably having 1 to 20 carbon atoms), a cycloalkylene group (preferably having 3 to 20 carbon atoms), an alkenylene group (preferably having 2 to 20 carbon atoms), and a group obtained by combining these groups.

Among them, $L^2$ is preferably a single bond.

In Formula 1B, $R^2$ represents a group selected from the group consisting of a hydroxy group and a group represented by *—$OR^3$, $R^3$ represents a hydrocarbon group which may have a hetero atom, * represents a bonding position, and when the group represented by Formula 1B has a plurality of $R^3$'s, the plurality of $R^3$'s may be the same as or different from each other and may be bonded to each other to form a ring. $R^3$ is not particularly limited, and examples thereof include an alkyl group (preferably an alkyl group having 1 to 10 carbon atoms). As $R^3$, the same group as $Z^3$ described below can also be used.

In Formula 1B, m represents an integer of 1 to 5, and particularly, from the viewpoint of obtaining an adhesive composition having a more excellent effect of the present invention, m is preferably 2 or more, preferably 4 or less, and more preferably 3 or less.

When at least one of $R^2$'s is a hydroxy group, an adhesive composition having more excellent adhesiveness and more excellent hydrophilicity is obtained.

In particular, when two or more of $R^2$'s are hydroxy groups, an adhesive composition having further excellent adhesiveness and further excellent hydrophilicity is obtained.

When $R^2$ is a hydroxy group, the number of hydroxy groups of the group represented by Formula 1B is not particularly limited, but is preferably 1 to 3 and more preferably 2 or 3.

From the viewpoint of obtaining a polymer compound having a more excellent effect of the present invention, the group represented by Formula 1B is more preferably a group represented by Formula 1B' below.

[Chemical Formula 2]

(1B')

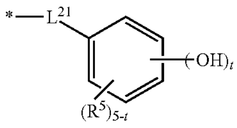

In Formula 1B', $L^{21}$ represents a single bond or a divalent group, the divalent group for $L^{21}$ is not particularly limited, but examples thereof include the same group as $L^2$ in Formula 1B, and preferred embodiments are also the same.

$R^5$ represents a hydrogen atom or a group represented by $*—OR^{31}$, * represents a bonding position, $R^{31}$ represents a hydrocarbon group which may have a hetero atom. Examples of the group represented by $*—OR^{31}$ for $R^5$ include the same group as the group represented by $*—OR^3$ (which is one form of the group represented by $R^2$) in Formula 1B having been already described, and preferred embodiments are also the same.

A plurality of $R^{31}$'s may be bonded to each other to form a ring, and a plurality of $R^5$'s may be the same as or different from each other.

In Formula 1B', t represents an integer of 1 to 5, and from the viewpoint of obtaining a polymer compound having a more excellent effect of the present invention, t is preferably 1 to 3 and more preferably 2 or 3.

From the viewpoint of obtaining a polymer compound having more excellent adhesiveness and more excellent hydrophilicity, the group represented by Formula 1B is preferably at least one group selected from the group consisting of groups represented by Formulas 2a to 2g below. In Formulas 2a to 2g, * represents a bonding position.

[Chemical Formula 3]

(2a)

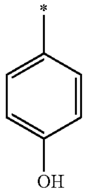

-continued (2b)

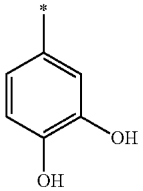

(2c)

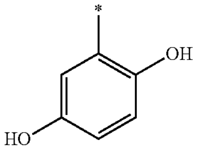

(2d)

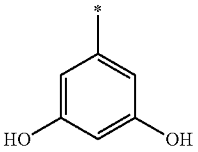

(2e)

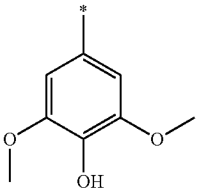

(2f)

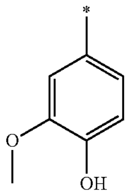

(2g)

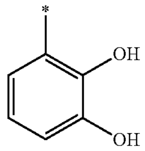

The content of the unit 1A in the present polymer compound is not particularly limited, but is preferably 0.01 to 99.99 mol %, preferably 0.01 to 30 mol %, more preferably more than 2 mol % and 20 mol % or less, further preferably 5 to 15 mol %, and particularly preferably 5 to 10 mol %, when the content of all units contained in the polymer compound is regarded as 100 mol %. The present polymer compound may contain one kind of the unit 1A alone or two or more kinds thereof. When the present polymer compound contains two or more kinds of the units 1A, the total content thereof is preferably within the above numerical range.

When the content of the unit 1A is within the above range, a polymer compound having a more excellent effect of the present invention is obtained.

The content of the unit 1A in the polymer compound means a value obtained using $^1H$-NMR.

The molecular weight of the present polymer compound is not particularly limited, and may be appropriately adjusted according to use application, but in general, the weight average molecular weight is preferably 1000 to 500000 and more preferably 10,000 to 120,000. When the weight average molecular weight is within the above range, the polymer compound has more excellent adhesion strength. In the present specification, the weight average molecular weight means a weight average molecular weight in terms of polystyrene measured by gel permeation chromatography (GPC).

The molecular weight distribution (weight average molecular weight/number average molecular weight) is not particularly limited, but is generally preferably 1.0 to 40, more preferably 1.5 to 35, and further preferably 2.0 to 10. When the molecular weight distribution is within the above range, the polymer compound has more excellent adhesion strength.

(Other Units)

The present polymer compound may contain other units within the range in which the effect of the present invention is exhibited as long as the present polymer compound contains the unit 1A. The other units are not particularly limited, and examples thereof include a repeating unit represented by Formula 2 (hereinafter, also referred to as "unit 2"). In the present specification, the unit 2 means a repeating unit different from the unit 1A.

[Chemical Formula 4]

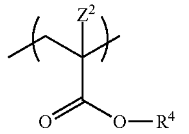

(2)

In Formula 2, $Z^2$ represents a hydrogen atom or a monovalent group, and $R^4$ represents a monovalent organic group.

The monovalent group for $Z^2$ is not particularly limited, but examples thereof include the same group as the monovalent group for $Z^1$, and among them, a hydrogen atom, a methyl group, or an ethyl group is preferred, and a hydrogen atom or a methyl group is more preferred.

The monovalent organic group for $R^4$ is not particularly limited, but from the viewpoint of obtaining a polymer compound having a more excellent effect of the present invention, a hydrocarbon group having 1 to 20 carbon atoms which may have a hetero atom is preferred, and a linear, branched, or cyclic alkyl group having 1 to 10 carbon atoms is more preferred.

Among them, $R^4$ is preferably a linear or branched alkyl group having 1 to 10 carbon atoms, more preferably a linear or branched alkyl group having 3 to 10 carbon atoms, further preferably a linear or branched alkyl group having 4 to 10 carbon atoms, and particularly preferably a linear or branched alkyl group having 5 to 10 carbon atoms.

When $R^4$ is a linear alkyl group, if the number of carbon atoms is 2 or more, the polymer compound has more excellent flexibility, and as a result, has more excellent adhesiveness when applied to an adhesive composition.

When $R^4$ is a linear alkyl group, if the number of carbon atoms is 9 or less, the polymer compound has more excellent rigidity, and as a result, has more excellent adhesiveness when applied to an adhesive composition.

The content of the unit 2 in the present polymer compound is not particularly limited, but is preferably 0.01 to 99.99 mol % and more preferably 60 to 95 mol % when the content of all repeating units contained in the present polymer compound is regarded as 100 mol %. The present polymer compound may contain one kind of the unit 2 alone or two or more kinds thereof. When the present polymer compound contains two or more kinds of the units 2, the total content thereof is preferably within the above numerical range.

[Use Application]

Since the present polymer compound has excellent film formability and excellent hydrophilicity, a composition containing the present polymer compound and a solvent can be used as an adhesive composition, particularly, an adhesive composition that is also applicable to a hydrophilic surface. When an adhesive composition layer is formed on a support and then, as necessary, the solvent is removed to form a coating film (adhesive layer), the adhesive composition can be used as an adhesive tape or the like in which the support and the adhesive layer are laminated.

As illustrated in Examples described below, the adhesive composition containing the present polymer compound can also be used for bonding a fluororesin (for example, polytetrafluoroethylene).

When the adhesive composition is coated onto an adherend, an adhesive surface (adhesive composition layer) can also be formed on the adherend. When the present polymer compound has a hydroxy group, more excellent adhesiveness is likely to be exhibited between the present polymer compound and the surface of the adherend ("adherend surface"). By blending a known curing agent, which reacts with a hydroxy group, with the adhesive composition, forming a film to form an adhesive layer, bonding an adherend, and then heating and crosslinking the adherend, the present polymer compound in the adhesive layer is cured to form a cured product, and thus a more excellent adhesion strength is easily obtained.

The method for obtaining the adhesive composition is not particularly limited, and examples thereof include a method of mixing the present polymer compound and a solvent. The solvent is not particularly limited as long as it can disperse the present polymer compound. The content of the solvent is not particularly limited, and for example, the content may be adjusted so that the solid content in the adhesive composition is 0.1 to 99 mass %.

[Method for Producing Polymer Compound]

The method for producing the present polymer compound is not particularly limited, and a known production method can be applied. In particular, from the viewpoint that the present polymer compound can be produced more efficiently, the following method for producing a polymer compound is preferred.

First Embodiment

A first embodiment of the method for producing the polymer compound of the present invention is a method for producing the polymer compound, the method including synthesizing a monomer A represented by Formula 5 below by an esterification reaction between a cinnamic acid derivative represented by Formula 3 below and a hydroxy group-containing (meth)acrylate compound represented by Formula 4 below (monomer A synthesis step), and polymerizing the obtained monomer A to obtain a polymer compound (polymerization step). Hereinafter, each step of the present production method will be described in detail.

(Monomer A Synthesis Step)

This step is a step of synthesizing a monomer A by an esterification reaction between a compound represented by Formula 3 below and a hydroxy group-containing (meth) acrylate compound represented by Formula 4 below.

Compound Represented by Formula 3

[Chemical Formula 5]

(3)

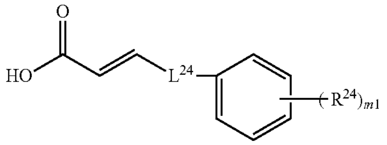

In Formula 3, $R^{24}$ represents a group selected from the group consisting of a hydroxy group and a group represented by *—$OR^{34}$, and $R^{34}$ represents a hydrocarbon group which may have a hetero atom. A plurality of $R^{24}$'s may be bonded to each other to form a ring, and a plurality of $R^{34}$'s may be the same as or different from each other.

Examples of the group represented by *—$OR^{34}$ for $R^{24}$ include the same group as the group represented by *—$OR^{3}$ (which is one form of the group represented by $R^{2}$) in Formula 1B, and preferred embodiments are also the same.

In Formula 3, m1 represents an integer of 1 to 5, and particularly, from the viewpoint of obtaining a polymer compound having a more excellent effect of the present invention, m1 is preferably 2 or more, preferably 4 or less, and more preferably 3 or less.

$L^{24}$ represents a single bond or a divalent group, the divalent group for $L^{24}$ is not particularly limited, but examples thereof include the group described as $L^{2}$ in Formula 1B, and preferred embodiments are also the same. Among them, $L^{24}$ is preferably a single bond from the viewpoint that the present polymer compound is easily available and can be more easily produced.

The compound represented by Formula 3 is preferably a cinnamic acid derivative represented by Formula 3A below from the viewpoint that raw materials are more easily available and the present polymer compound is easily obtained in a simpler manner.

[Chemical Formula 6]

(3A)

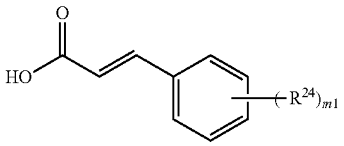

In Formula 3A, $R^{24}$ and m1 have the same meaning as $R^{24}$ and m1 in Formula 3, and embodiments thereof are also the same.

The cinnamic acid derivative is preferably at least one selected from the group consisting of coumaric acid (preferably p-coumaric acid), caffeic acid, 2,5-dihydroxycinnamic acid, 3,5-dihydroxycinnamic acid, sinapinic acid, ferulic acid, 2,3-dihydroxycinnamic acid, and derivatives thereof, and more preferably at least one compound selected from the group consisting of coumaric acid (preferably p-coumaric acid), caffeic acid, 2,5-dihydroxycinnamic acid, 3,5-dihydroxycinnamic acid, sinapinic acid, ferulic acid, and 2,3-dihydroxycinnamic acid, from the viewpoint that the cinnamic acid derivative is more easily available and a polymer compound is easily obtained in a simpler manner.

[Chemical Formula 7]

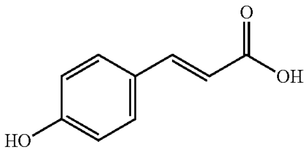

coumaric acid

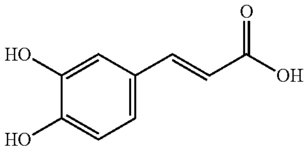

caffeic acid

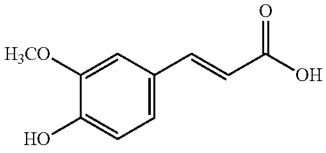

ferulic acid

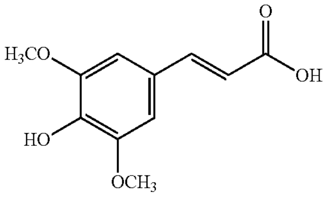

sinapinic acid

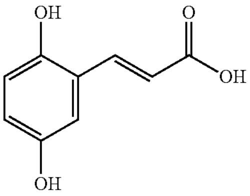

2,5-Dihydroxycinnamic acid

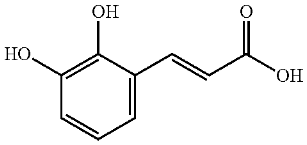

2,3-Dihydroxycinnamic acid

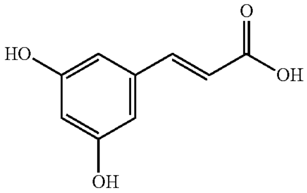

3,5-Dihydroxycinnamic acid

Hydroxy Group-Containing (Meth)Acrylate Compound

[Chemical Formula 8]

(4)

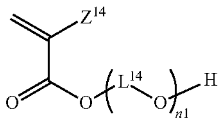

In Formula 4, $Z^{14}$ represents a hydrogen atom or a monovalent group, $L^{14}$ represents a divalent group, n1 represents an integer of 1 or more, and a plurality of $L^{14}$'s may be the same as or different from each other.

The monovalent group for $Z^{14}$ in Formula 4 is not particularly limited, but examples thereof include the group described as the monovalent group for $Z^1$ in Formula 1A, and preferred embodiments are also the same.

The divalent group for $L^{14}$ is not particularly limited, but examples thereof include the group described as the divalent group for $L^1$ in Formula 1A, and preferred embodiments are also the same.

The upper limit of n1 is not particularly limited, but is preferably 50 or less, more preferably 20 or less, and further preferably 10 or less. Among them, n1 is particularly preferably 1.

Monomer A

[Chemical Formula 9]

(5)

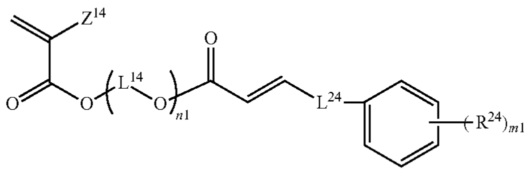

In Formula 5, $R^{24}$ represents a group selected from the group consisting of a hydroxy group and a group represented by $*—OR^{34}$, $R^{34}$ represents a hydrocarbon group which may have a hetero atom, * represents a bonding position, $Z^{14}$ represents a hydrogen atom or a monovalent group, $L^{14}$ represents a divalent group, $L^{24}$ represents a single bond or a divalent group, m1 represents an integer of 1 to 5, n1 represents an integer of 1 or more, and a plurality of $R^{24}$'s and a plurality of $L^{14}$'s may be the same as or different from each other.

Each symbol in Formula 5 has the same meaning as each corresponding symbol in Formulas 3 and 4, and preferred embodiments are also the same.

The esterification reaction method is not particularly limited, and a known method can be used. Examples of the esterification method include a method of reacting a carboxy group of a cinnamic acid derivative and a hydroxy group of a hydroxy group-containing (meth)acrylate compound in the presence of an acid catalyst (hereinafter, also referred to as "method 1") and a method of reacting a carboxy group of a cinnamic acid derivative and a hydroxy group of a hydroxy group-containing (meth)acrylate compound in the presence of a dehydrating condensing agent (hereinafter, also referred to as "method 2"). Among them, the method 2 is preferred from the viewpoint of obtaining a polymer compound in a simpler manner.

The acid catalyst used in the method 1 is not particularly limited as long as it is an acid catalyst used in an esterification reaction, and examples thereof include mineral acids such as sulfuric acid, hydrochloric acid, nitric acid, phosphoric acid, and boric acid, and partially neutralized salts thereof; heteropoly acids such as tungstic acid, molybdic acid, tungstosilicic acid, molybdosilicic acid, tungstophosphoric acid, and molybdophosphoric acid, and partially neutralized salts thereof; organic sulfonic acids such as methanesulfonic acid and p-toluenesulfonic acid; Lewis acids such as boron fluoride, boron chloride, aluminum chloride, tin dichloride, and tin tetrachloride, and complex salts thereof; acidic ion-exchange resins having an ion-exchange group such as a sulfonic acid group and an alkyl sulfonic acid group; and acidic zeolite such as mordenite type, X type, Y type, p type, and ZSM-5 type. Among them, an organic sulfonic acid is preferred, and p-toluenesulfonic acid is particularly preferred. These acid catalysts may be used singly or in combination of two or more kinds thereof.

The used amount of the acid catalyst in the method 1 is not particularly limited, but is, for example, preferably 0.001 mol % or more and preferably 30 mol % or less with respect to 100 mol % of the cinnamic acid derivative.

When the reaction is performed in the presence of an acid catalyst, itis preferable to remove water generated by the reaction (hereinafter, also referred to as generated water) to the outside of the reaction system. Examples of the method for removing generated water include a method of performing a reaction under reduced pressure, a method of performing a reaction using an azeotropic solvent, and a method of performing a reaction in the presence of a desiccant. Any one of these methods may be used, or two or more methods may be used in combination.

The reaction temperature of the method 1 is not particularly limited, but is generally preferably 0 to 150° C.

The dehydrating condensing agent used in the method 2 is not particularly limited as long as it is a substance generally used in an esterification reaction, and for example, 1,3-dicyclohexylcarbodiimide (DCC), 1,3-diisopropylcarbodiimide, 1,3-di-(2-butyl)carbodiimide, 1-t-butyl-3-ethylcarbodiimide, 1-(2-butyl)-3-ethylcarbodiimide, 1-(3-dimethylaminopropyl)-3-ethylcarbodiimide, and the like can be used.

The used amount of the dehydrating condensing agent is not particularly limited, but specifically, is preferably 0.5-fold mol or more (0.5 equivalents or more) and preferably 3-fold mol or less (3.0 equivalents or less), with respect to 1 mol of the cinnamic acid derivative.

The solvent used in the method 2 is not particularly limited as long as it is inert and dissolves a reactant, and amides such as N,N-dimethylformamide and N,N-dimethylacetamide; ethers such as diethyl ether, dipropyl ether, dibutyl ether, tetrahydrofuran, dioxane, and 1,2-dimethoxyethane; alkyl nitriles such as acetonitrile and propionitrile; and the like are preferred.

The reaction temperature of the method 2 is not particularly limited, but is preferably −40 to 150° C. The reaction pressure is not particularly limited, and may be any of normal pressure, increased pressure, and reduced pressure. The reaction time may be appropriately set so that the reaction is completed.

In the reaction of the method 2, as necessary, an additive, for example, an additive for suppressing the side reaction of a carbodiimide-based condensing agent may be used. Examples of the additive include bases such as N,N-dimethyl-4-aminopyridine (DMAP), pyridine, and triethylamine. These generally have the action of promoting the reaction rate.

The used amount of the additive is not particularly limited, but is preferably 0.01-fold mol or more (0.01 equivalents or more) and preferably 1.5-fold mol or less, with respect to 1 mol of the cinnamic acid derivative.

(Polymerization Step)

This step is a step of polymerizing the monomer A to obtain the polymer compound. The method of polymerizing the monomer A is not particularly limited, and a known method can be used. Examples of the method of polymerizing the monomer A (polymerization method) include a bulk polymerization method, a solution polymerization method, and an aqueous dispersion polymerization method (such as a suspension polymerization method or an emulsion polymerization method), and among these, from the viewpoint of obtaining a polymer compound in a simpler manner, a solution polymerization method or an aqueous dispersion polymerization method is preferred.

A solvent used in a solution polymerization method is not particularly limited, and examples thereof include hydrocarbons (such as toluene), ethers (such as diethyl ether and tetrahydrofuran), halogenated hydrocarbons (such as dichloromethane and chloroform), ketones (such as acetone), alcohols (such as methanol and isopropanol), nitriles (such as acetonitrile), esters (such as ethyl acetate), carbonates (such as ethylene carbonate), and supercritical carbon dioxide.

The solvent may be used singly or in combination of two or more kinds thereof.

A polymerization initiator used in the photopolymerization reaction is not particularly limited, and a known thermal polymerization initiator and/or photopolymerization initiator can be used.

As the polymerization initiator, for example, an organic peroxide, an azo compound, and the like can be used. Examples of the organic peroxide include 1,1-bis(t-hexylperoxy)-3,3,5-trimethylcyclohexane, t-hexylperoxypivalate, t-butylperoxypivalate, 2,5-dimethyl-2,5-bis(2-ethylhexanoylperoxy)hexane, t-hexylperoxy-2-ethylhexanoate, t-butylperoxy-2-ethylhexanoate, t-butylperoxyisobutyrate, t-butylperoxy-3,5,5-trimethylhexanoate, and t-butylperoxylaurate.

Examples of the azo compound include azobisisobutyronitrile (AIBN) and azobiscyclohexanecarbonitrile. These polymerization initiators may be used singly or in combination of two or more kinds thereof.

In this step, another monomers may be reacted together with the monomer A to synthesize a copolymer having a repeating unit based on the monomer A and a repeating unit based on the another monomer. The other monomer is not particularly limited, and examples thereof include the monomer represented by Formula 2 having been already described.

Second Embodiment

A second embodiment of the method for producing the polymer compound according to the present invention is a method for producing the polymer compound, the method including: synthesizing a monomer B represented by Formula 5' below by an esterification reaction between a cinnamic acid derivative represented by Formula 3' below and a hydroxy group-containing (meth)acrylate compound represented by Formula 4' below (monomer B synthesis step); reacting the hydroxy group of the monomer B with a protecting agent to synthesize a monomer C represented by Formula 6' below having the protected hydroxy group (monomer C synthesis step); polymerizing the monomer C to synthesize a polymer compound precursor represented by Formula 7' below (polymer compound precursor synthesis step); and deprotecting the protected hydroxy group of the polymer compound precursor to obtain the polymer compound (deprotection step).

As described below, the cinnamic acid derivative used in the present production method has at least one hydroxy group. The present inventors have conducted intensive studies on the method for producing the present polymer compound and have found that, although a desired polymer compound can be simply obtained in an excellent yield by the production method of the first embodiment, when the cinnamic acid derivative has a hydroxy group (hydroxyl group), there is room for slight improvement in the yield of the polymer compound.

As a result of intensive studies on the above reasons, the present inventors have conceived that there may be room for improvement in the progress rate of the polymerization reaction due to the radical scavenging action of the hydroxy group of the cinnamic acid derivative.

Therefore, on the basis of the above finding of the present inventors, the hydroxy group of the monomer is protected with a protecting agent before polymerizing the monomer to obtain a polymer compound, and as a result, a very high yield can be obtained, and thereby the invention according to the present production method has been completed.

Hereinafter, each step of the present production method will be described in detail.

(Monomer B Synthesis Step)

The monomer B synthesis step is a step of synthesizing a monomer B represented by Formula 5' below by an esterification reaction between a compound represented by Formula 3' below and a hydroxy group-containing (meth) acrylate compound represented by Formula 4' below.

Compound Represented by Formula 3'

[Chemical Formula 10]

(3')

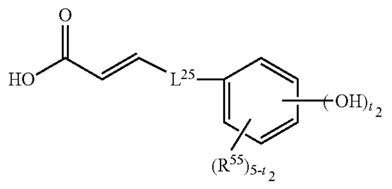

In Formula 3', $R^{55}$ represents a hydrogen atom or a group represented by *—$OR^{35}$, $R^{35}$ represents a hydrocarbon group which may have a hetero atom, * represents a bonding position, $t_2$ is an integer of 1 to 5, a plurality of $R^{35}$'s may be bonded to each other to form a ring, a plurality of $R^{55}$'s may be the same as or different from each other.

The group represented by *—$OR^{35}$ for $R^{55}$ in Formula 3 is not particularly limited, but examples thereof include the same group as the group represented by *—$OR^3$ having been already described as one embodiment of the group represented by $R^2$ in Formula 1B, and preferred embodiments are also the same.

From the viewpoint that raw materials are more easily available and the present polymer compound is easily obtained in a simpler manner, $t_2$ is preferably 1 to 3 and more preferably 2 or 3.

$L^{25}$ represents a single bond or a divalent group, the divalent group for $L^{25}$ is not particularly limited, but examples thereof include the group having been already described as the divalent group for $L^{21}$ in Formula 11B', and preferred embodiments are also the same. Among them, from the viewpoint that raw materials are more easily available and the present polymer compound can be produced in a simpler manner, $L^{25}$ is preferably a single bond, and the compound represented by Formula 3' is preferably the cinnamic acid derivative represented by Formula 3A having been already described.

Hydroxy Group-Containing (Meth)Acrylate Compound

[Chemical Formula 11]

(4')

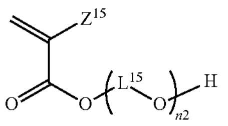

In Formula 4', $Z^{15}$ represents a hydrogen atom or a monovalent group, $L^{15}$ represents a divalent group, n2 represents an integer of 1 or more, and a plurality of $L^{15}$'s may be the same as or different from each other. The monovalent group for $Z^{15}$ in Formula 4' is not particularly limited, but examples thereof include the group having been already described as the monovalent group for $Z^{14}$ in Formula 4, and preferred embodiments are also the same. The divalent group for $L^{15}$ in Formula 4' is not particularly limited, but examples thereof include the group described as the divalent group for $L^{14}$ in Formula 4, and preferred embodiments are also the same.

The upper limit of n2 in Formula 4' is not particularly limited, but is preferably 50 or less, more preferably 20 or less, and further preferably 10 or less. Among them, n2 is particularly preferably 1.

Monomer B

[Chemical Formula 12]

(5')

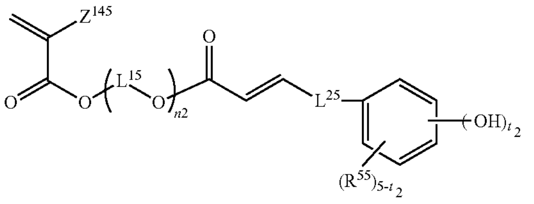

In Formula 5', $R^{55}$ represents a hydrogen atom or a group represented by $*—OR^{35}$, $R^{35}$ represents a hydrocarbon group which may have a hetero atom, * represents a bonding position, $Z^{15}$ represents a hydrogen atom or a monovalent group, $L^{15}$ represents a divalent group, $L^{25}$ represents a single bond or a divalent group, n2 is an integer of 1 or more, $t_2$ is an integer of 1 to 5, a plurality of $R^{35}$'s may be bonded to each other to form a ring, and a plurality of $R^{55}$'s and a plurality of $L^{15}$'s may be the same as or different from each other.

The groups represented by $Z^{15}$ and $L^{15}$ in Formula 5' have the same meaning as the corresponding groups in Formula 4', and preferred embodiments are also the same. The groups represented by $L^{25}$, $R^{55}$, and $t_2$ in Formula 5' have the same meaning as the corresponding groups in Formula 3', and preferred embodiments are also the same. n2 in Formula 5' has the same meaning as n2 in Formula 4', and preferred embodiments are also the same.

The esterification reaction method is not particularly limited, a known method can be used, the method described as the esterification method in the first embodiment can be used, and preferred embodiments are also the same.

(Monomer C Synthesis Step)

This step is a step of reacting the hydroxy group of the monomer B with a protecting agent to synthesize a monomer C represented by Formula 6' having the protected hydroxy group.

Monomer C

[Chemical Formula 13]

(6')

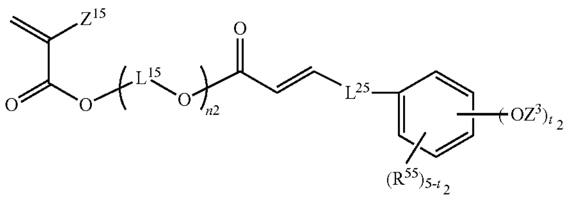

In Formula 6', $R^{55}$ represents a hydrogen atom or a group represented by $*—OR^{35}$, $R^{35}$ represents a hydrocarbon group which may have a hetero atom, * represents a bonding position, $Z^{15}$ represents a hydrogen atom or a monovalent group, $L^{15}$ represents a divalent group, $L^{25}$ represents a single bond or a divalent group, $Z^3$ is a protecting group of the hydroxy group, n2 is an integer of 1 or more, $t_2$ is an integer of 1 to 5, a plurality of $R^{55}$, a plurality of $L^{15}$, and a plurality of $Z^3$ may be the same as or different from each other, and a plurality of $Z^3$'s may be bonded to each other to form a ring.

Each of $Z^{15}$, $L^{15}$, $L^{25}$, $R^{55}$, n2, and $t_2$ in Formula 6 has the same meaning as each corresponding symbol in Formulas 3' and 4', and preferred embodiments are also the same.

The protecting group for $Z^3$ is not particularly limited, and for example, protecting groups as shown in PROTECTIVE GROUPS in ORGANIC SYNTHESIS 4th Ed. (JOHN WILEY & SONS) p. 367 to 430 can be used.

More specifically, examples of the protecting group for $Z^3$ include an ether-based protecting group, a silyl ether-based protecting group, an ester-based (acyl-based) protecting group, a carbonate-based protecting group, a carbamate-based protecting group, a phosphinate-based protecting group, and a sulfonate-based protecting group, and from the viewpoint that the present polymer compound can be produced in a simpler manner, a carbonate-based protecting group is preferred.

Examples of the ether-based protecting group include a methyl group ($*—CH_3$, wherein * represents a bonding position with an oxygen atom derived from a hydroxy group, and forms a protected hydroxy group represented by $*—OCH_3$ in relation to the hydroxy group; the same applies hereinafter), a methoxymethyl group ($*—CH_3OCH_3$), a benzoxymethyl (BOM) group ($*—CH_2OCH_2C_6H_5$), a methoxyethoxymethyl group ($*—CH_2OCH_2CH_2OCH_3$), a 2-(trimethylsilyl)ethoxymethyl group ($*—CH_2OCH_2CH_2Si(CH_3)_3$), a methylthiomethyl group ($*—CH_2SCH_3$), a phenylthiomethyl group (*—$CH_2SC_6H_5$), an azidomethyl group (*—$CH_2N_3$), a cyanomethyl group (*—$CH_2CN$), a 2,2-dichloro-1,1-difluoroethyl group (*—$CF_2Cl_2CH$), a 2-chloroethyl group (*—$CH_2CH_2Cl$), a 2-bromoethyl group (*—$CH_2CH_2Br$), a t-butyldiphenylsilylethyl group, a tetrahydropyranyl group, a 1-ethoxyethyl group (*—$CH(OC_2H_5)CH_3$), a phenacyl group (*—$CH_2COC_6H_5$), a 4-bromophenacyl group (*—$CH_2COC_6H_4$-4-Br), a cyclopropylmethyl group (*—$CH_2$-c-$C_3H_5$), an allyl group (*—$CH_2CH{=}CH_2$), a prenyl group (dimethylallyl group, *—$CH_2CH{=}C(CH_3)_2$), a 2-cyclohexene-1-yl group, a propargyl group (*—$CH_2C{\equiv}CH$), an isopropyl group (*—$CH(CH_3)_2$), a cyclohexyl group (*-c-$C_6H_{11}$), a t-butyl group (*—$C(CH_3)_3$), a benzyl group (*—$CH_2C_6H_5$), a 2,4-dimethylbenzyl group (*—$CH_2C_6H_3$-2,4-$(CH_3)_2$), a 4-methoxybenzyl group (*—$CH_2C_6H_4$-4-$OCH_3$), an o-nitrobenzyl group (*—$CH_2C_6H_4$-o-$NO_2$), a p-nitrobenzyl group (*—$CH_2C_6H_4$-p-$NO_2$), a 2,6-dichlorobenzyl group (*—$CH_2C_6H_3$-2,6-$Cl_2$), a 3,4-dichlorobenzyl group (*—$CH_2C_6H_3$-3,4-$Cl_2$), a 4-(dimethylamino)carbonylbenzyl group (*—$CH_2C_6H_4CON(CH_3)_2$), a 4-methylsulfinylbenzyl group (*—$CH_2C_6H_4(O)SCH_3$), a 9-anthrylmethyl group (*—$CH_2$-9-anthryl), a 4-picolyl group (*—$CH_2$-4-pyridyl), a heptafluoro-p-tolyl group (*—$C_5F_4$—$CF_3$), and a tetrafluoro-p-pyridyl group (*—$C_5F_4N$).

Examples of the silyl ether-based protecting group include a trimethylsilyl group (TMS, *—$Si(CH_3)_3$), a t-butyldimethylsilyl group (TBDMS, $Si(CH_3)_2C(CH_3)_3$), a butyldiphenylsilyl group (TBDPS), and a triisopropylsilyl group (TIPS).

Examples of the ester-based (acyl-based) protecting group include a formyl group (*—C(O)H), an acetyl group (*—$C(O)CH_3$), a levulinoyl group (*—$C(O)CH_2CH_2C(O)CH_3$), a pivaloyl group (*—$C(O)C(CH_3)_3$), a benzoyl group (*—$C(O)C_6H_5$), and *—C(O)-9-fluorene.

Examples of the carbonate-based protecting group include a methoxycarbonyl group (*—$C(O)OCH_3$), a tert-butoxycarbonyl group (Boc group, *—$C(O)OC(CH_3)_3$), a 1-adamantyloxycarbonyl group (1-Adoc group, *—C(O)O-1-adamantyl (Ad)), a dimethylpentyloxycarbonyl group (Doc group, *—C(O)OCH(i-propyl)$_2$), an allyloxycarbonyl group (Alock group, *—$C(O)OCH_2CH{=}CH_2$), a trichloroethoxycarbonyl group (Troc group, *—$C(O)OCH_2CCl_3$), a vinyloxycarbonyl group (*—$C(O)OCH{=}CH_2$), and a benzyloxycarbonyl group (Cbz group, *—$C(O)OCH_2C_6H_5$).

Examples of the carbamate-based protecting group include *—C(O)NHR.

Examples of the phosphinate-based protecting group include a dimethylphosphinyl group (*—$P(O)(CH_3)_2$), a dimethylphosphinothioyl group (*—$P(S)(CH_3)_2$), and a diphenylphosphinothioyl group (*—$P(S)(C_6H_5)_2$).

Examples of the sulfonate-based protecting group include a methylsulfonyl group (*—$S({=}O)_2CH_3$), a trifluoromethylsulfonyl group (*—$S({=}O)_2CF_3$), a p-toluenesulfonyl group (tosyl group, *—$S({=}O)_2C_6H_4$-p-$CH_3$), a formylbenzenesulfonyl group (*—$S({=}O)_2C_6H_4$-o-CHO), and a benzylsulfonyl group (*—$S({=}O)_2CH_2C_6H_5$).

Among them, from the viewpoint of obtaining the present polymer compound in a simpler manner, the protecting group for $Z^3$ is preferably a carbonate-based protecting group, preferably at least one selected from the group consisting of a methoxycarbonyl group (*—$C(O)OCH_3$), a tert-butoxycarbonyl group (Boc group, *—$C(O)OC(CH_3)_3$), a 1-adamantyloxycarbonyl group (1-Adoc group, *—C(O)O-1-adamantyl (Ad)), a dimethylpentyloxycarbonyl group (Doc group, *—C(O)OCH(i-propyl)$_2$), an allyloxycarbonyl group (Alock group, *—$C(O)OCH_2CH{=}CH_2$), a trichloroethoxycarbonyl group (Troc group, *—$C(O)OCH_2CCl_3$), a vinyloxycarbonyl group (*—$C(O)OCH{=}CH_2$), and a benzyloxycarbonyl group (Cbz group, *—$C(O)OCH_2C_6H_5$), and more preferably a tert-butoxycarbonyl group (Boc group, *—$C(O)OC(CH_3)_3$).

The plurality of $Z^3$'s (*—$OZ^3$'s) may be bonded to each other to form a ring. Examples of such a form include a group represented by Formula 6B below. In the following formula, the wavy line in Formula 6B indicates a partial structure of the monomer C, and the position thereof coincides with the wavy line in Formula 6'. The wavy line in Formula 6' does not indicate the structure of the compound. This wavy line is merely provided for describing the correspondence of the compound of Formula 6' with specific examples of the partial structure of Formula 6B.

In Formula 6B, only a form in which t in Formula 6' is 2 is shown, but the number of *—$OZ^{35}$'s per repeating unit and the arrangement thereof are examples and are not limited to the following description.

[Chemical Formula 14]

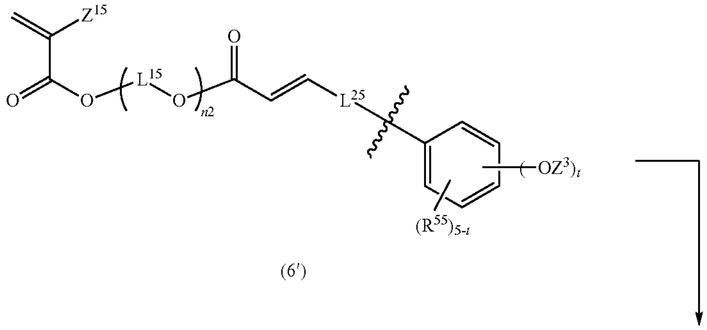

(6')

-continued

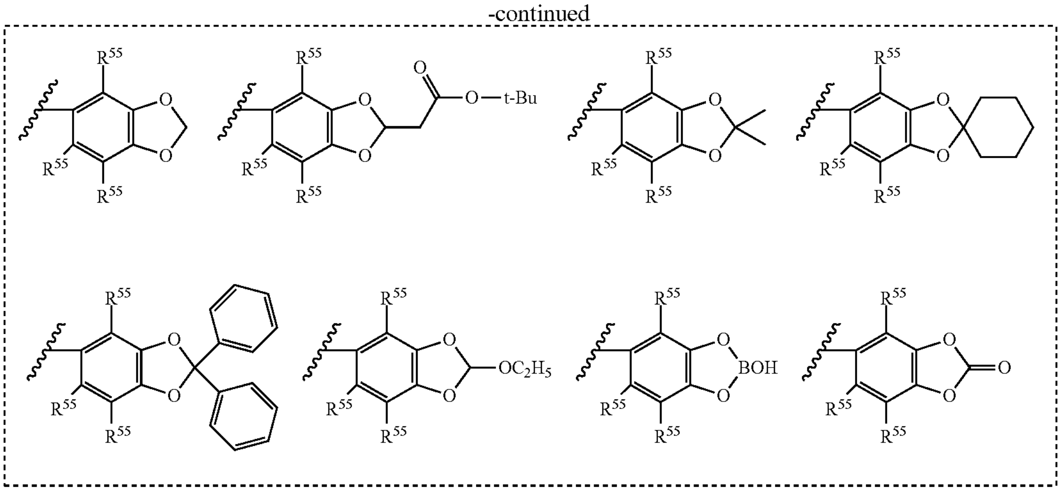

(6B)

The protecting agent used in this step is not particularly limited, and a known protecting agent may be used according to the type of the protecting group. The reaction conditions may be appropriately adjusted according to the type of the protecting agent. The type of the protecting agent and reaction conditions are described for each kind of the protecting group, for example, in PROTECTIVE GROUPS in ORGANIC SYNTHESIS 4th Ed. (JOHN WILEY & SONS) p. 367 to 430, and can be referred to.

(Polymer Compound Precursor Synthesis Step)

This step is a step of polymerizing the monomer C to obtain a polymer compound precursor represented by Formula 7'.

Polymer Compound Precursor

[Chemical Formula 15]

(7')

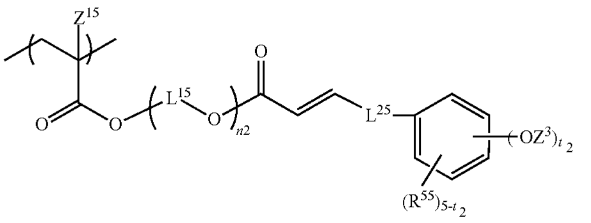

Each symbol of $Z^{15}$, $L^{15}$, $L^{25}$, $R^{55}$, $Z^3$, n2, and $t_2$ in Formula 7' has the same meaning as each corresponding symbol in Formula 6', and preferred embodiments are also the same, so that the description thereof is omitted.

The method of polymerizing the polymer compound precursor is not particularly limited, and a known synthesis method can be used. As the known synthesis method, for example, the method described as the method of polymerizing the monomer A in the first embodiment can be used, and preferred embodiments are also the same, so that the description thereof is omitted.

(Deprotection Step)

This step is a step of deprotecting the protected hydroxy group of the polymer compound precursor to obtain a polymer compound.

The method for deprotecting the protected hydroxy group ($*—OZ^3$) is not particularly limited, and a known method may be used according to the type of the protecting group. The reaction conditions may be appropriately adjusted according to the type of the protecting group. The type of the protecting group and reaction conditions are described for each kind of the protecting group, for example, in PROTECTIVE GROUPS in ORGANIC SYNTHESIS 4th Ed. (JOHN WILEY & SONS) p. 367 to 430, and can be referred to.

Through this step, $*—OZ^3$ is deprotected to the hydroxy group, and a desired polymer compound can be obtained.

[Dimer, Adhesive Composition, Method for Producing Adhesive Composition, and Method for Adjusting Adhesion Force]A dimer contains two of the above-described polymer compound (Chemical Formula 1) of the present invention. Therefore, the description of the contents of the above-described polymer compound is omitted.

In the above-described polymer compound (Chemical Formula 1) of the present invention, a double bond site adjacent to $R^1$ in Formula 1A of Chemical Formula 1 above has photosensitivity. Therefore, this double bond site is cleaved by irradiation with ultraviolet rays (UV), and the two polymer compounds are bonded to each other to form a dimer.

An embodiment of the dimer formation will be described by taking Poly(AEDPA-co-EHMA) described in detail in Examples as an example.

For example, as shown in FIG. 1, when Poly(AEDPA-co-EHMA), which is a polymer of AEDPA and EHMA, is irradiated with ultraviolet rays (for example, UV>300 nm), a double bond site adjacent to $R^1$ in Formula 1A is cleaved, and both of Poly(AEDPA-co-EHMA)'s are bonded to each other to form a dimer. When the dimer having the cross-linked structure is formed, the adhesive composition containing the polymer compound and a dimer thereof has an excellent adhesion strength.

When the adhesive composition containing the dimer that has been irradiated with ultraviolet rays is further irradiated with ultraviolet rays (for example, UV=254 nm), crosslinking between the dimers is released, a polymer compound having a double bond is formed again, and the adhesion strength is decreased. That is, the adhesion strength of the adhesive composition of the present invention can be reversibly adjusted by irradiation with ultraviolet rays.

In the adhesive composition of the present invention, from the viewpoint of a favorable adhesion strength, the cross-linking density is preferably 10000 to 20000 mol/$cm^3$, and the cross-linking density is more preferably 13000 to 17000 mol/$cm^3$. Here, a joint connecting polymer chains is referred to as a crosslinking point, and a polymer forms a three-dimensional network structure by crosslinking, and at that time, the number of crosslinking points present per repeating unit (unit volume) of a polymer chain is referred to as a cross-linking density. The method for calculating the cross-linking density is not particularly limited, and the cross-linking density can be calculated by a known method.

As described above, the method for producing the adhesive composition of the present invention can include a step of irradiating the adhesive composition with ultraviolet rays. The method for adjusting an adhesion force of the present invention can include a step of irradiating the adhesive composition containing the polymer compound with ultraviolet rays once or more.

Irradiation of the adhesive composition with ultraviolet rays can be performed in a dry state, a wet state, or water, and the adhesion strength of the adhesive composition can be adjusted in any environment.

The wavelength and irradiation time of the ultraviolet rays to be emitted are not particularly limited, and can be appropriately set according to the structure of the polymer compound and the like. Specifically, for example, the wavelength of ultraviolet rays for enhancing the adhesion strength can be in a range of 300 to 700 nm ($UV_{-H}$). The wavelength of ultraviolet rays for decreasing the adhesion strength can be, for example, in a range of 200 to 300 nm ($UV_{-L}$).

That is, in the adhesive composition of the present invention, the cross-linking density increases in the case of irradiation with ultraviolet rays of 300 to 700 nm (first ultraviolet irradiation ($UV_{-H}$)), and after the first ultraviolet irradiation, the cross-linking density decreases in the case of irradiation with ultraviolet rays of 200 to 300 nm (second ultraviolet irradiation ($UV_{-L}$)). The first ultraviolet irradiation ($UV_{-H}$) is preferably 300 to 450 nm, and the second ultraviolet irradiation ($UV_{-L}$) is preferably 220 to 270 nm. When the wavelength of the ultraviolet rays in the first ultraviolet irradiation and the second ultraviolet irradiation is within this range, the cross-linking density (adhesion force) can be reliably adjusted.

Specifically, in the adhesive composition of the present invention, the cross-linking density in the case of irradiation with ultraviolet rays of 200 to 300 nm (preferably 220 to 270 nm) is preferably 30% or less with respect to the cross-linking density in the case of irradiation with ultraviolet rays of 300 to 700 nm (preferably 300 to 450 nm). More specifically, for example, in the adhesive composition of the present invention, the cross-linking density in the case of irradiation with ultraviolet rays of 300 to 700 nm (preferably 300 to 450 nm) is preferably 10000 to 20000 mol/$cm^3$, and the cross-linking density in the case of irradiation with ultraviolet rays of 200 to 300 nm (preferably 220 to 270 nm) is preferably 3000 to 6000 mol/$cm^3$.

In the adhesive composition of the present invention, it is considered that, for example, when ultraviolet rays ($UV_{-H}$) in a range of 300 to 700 nm (preferably 300 to 450 nm) is applied, the crosslinking of the polymer compound (polymer chain) breaks weak H-bonds, and causes volume shrinkage that moves water molecules away from an adhesion interface, thereby improving the adhesion strength. On the other hand, for example, in the case of irradiation with ultraviolet rays ($UV_{-L}$) in a range of 200 to 300 nm (preferably 220 to 270 nm), the cross-linking bond is broken, and the adhesion strength is decreased. When ultraviolet rays ($UV_{-H}$) in a range of 300 to 700 nm is applied to the decrosslinked state, for example, a newly crosslinked covalent bond is formed again, and the adhesiveness is improved.

The number of times of irradiation of the adhesive composition of the present invention with ultraviolet rays can be appropriately set, and by alternately irradiating with ultraviolet rays having different wavelengths ($UV_{-H}$ and $UV_{-L}$) (the first ultraviolet irradiation and the second ultraviolet irradiation), for example, the effective switching of the adhesion force can be performed over three or more cycles. Therefore, the method for adjusting an adhesion force of the present invention includes a step of irradiating the adhesive composition of the present invention with ultraviolet rays once or more.

EXAMPLES

Hereinafter, the present invention will be described in more detail on the basis of Examples. Materials, used amounts, proportions, processing contents, processing procedures, and the like shown in the following Examples can be appropriately changed without departing from the gist of the present invention. Therefore, the scope of the present invention is not to be interpreted limitedly by the following Examples.

[Synthesis of AEDPA]

AEDPA (for the structure, see Scheme 1 described below) was synthesized by Scheme 1 described below. First, DHCA (3,4-dihydroxycinnamic acid, DHCA, 0.36 g, 1 equivalent) was placed in a 100 mL two-necked flask and dissolved in DMF (N,N-dimethylformamide) to obtain a solution. Next, a DMF solution (1 mL) of N,N'-dicyclohexylcarbodiimide (DCC) (0.49 g, 1.2 equivalents) and N,N-dimethyl-4-aminopyridine (DMAP, 28 mg, 0.1 equivalents) was added dropwise to the solution in an ice bath, and a DMF solution (1 mL) of hydroxyethyl acrylate (AHE, 0.28 g, 1.2 equivalents) was further added dropwise thereto in the ice bath to obtain a mixed liquid.

The mixed liquid was stirred at room temperature for 10 minutes, then heated to 110° C., and further stirred for 4 hours. The progress of the reaction was checked by thin-layer chromatography at ethyl acetate/hexane=2/1.

After completion of the reaction, the mixed liquid was concentrated until DMF of the mixed liquid had a volume of about half, added to dilute hydrochloric acid, and extracted with ethyl acetate. The organic phase was collected, washed with saturated brine, dried over $Na_2SO_4$, and concentrated to obtain a crude product.

Thereafter, the crude product was column-purified using a mobile phase containing ethyl acetate and hexane (30 to 40% ethyl acetate) to obtain a final product (AEDPA). The yield was about 40%.

Scheme 1

[Chemical Formula 16]

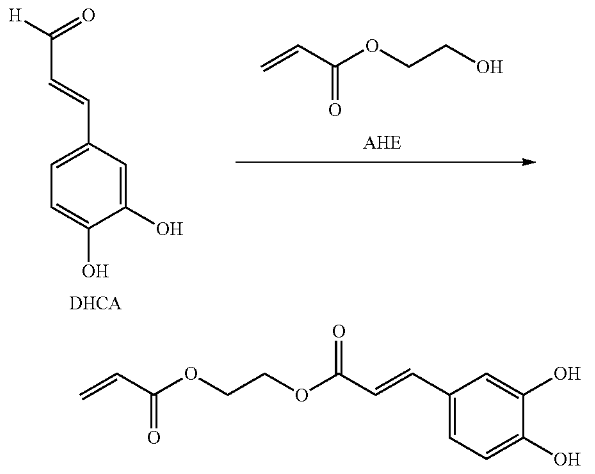

DHCA

AEDPA

[Synthesis of AEDPA-Boc]

Next, AEDPA-Boc (for the structure, see Scheme 2 described below) was synthesized by Scheme 2 described below. First, AEDPA (500 mg, 1 equivalent) was dissolved in 20 mL of acetone to obtain a solution. Next, $K_2CO_3$ (5 equivalents) was added to the solution to obtain a mixed liquid. Next, a $Boc_2O$ solution obtained by dissolving di-tert-butyl pyrocarbonate ("$Boc_2O$", 2.2 equivalents) in 3 mL of acetone was added dropwise to the mixed liquid to obtain a reaction liquid. Next, the reaction liquid was stirred at room temperature for 2 hours for reaction. The progress of the reaction was checked by thin-layer chromatography at hexane/ethyl acetate=2/1. The reaction liquid after the reaction was filtered, and the solid residue was washed three times with acetone. Next, the collected filtrate was concentrated and column-purified to obtain a colorless oily product. The yield was more than 90%.

Scheme 2

[Chemical Formula 17]

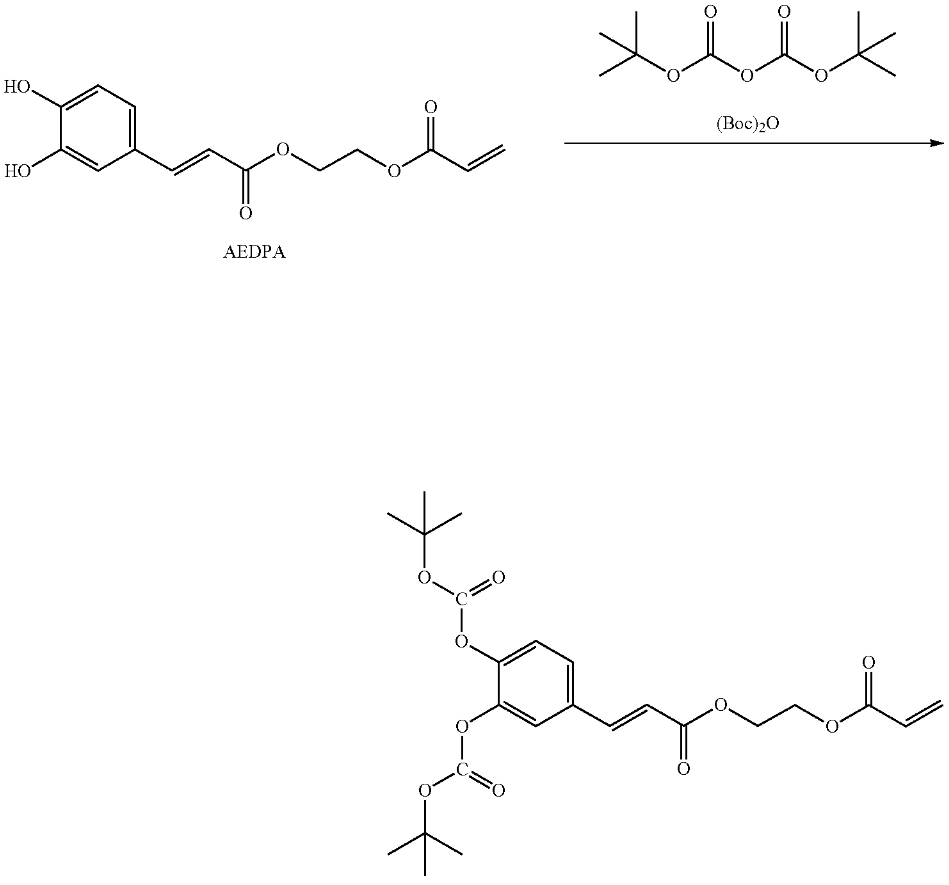

AEDPA

AEDPA-Boc

Synthesis Example 1: Synthesis of Polymer Compound A (Synthesis of AEDPA-Boc/Methacrylate Copolymer)

Next, an AEDPA-Boc/methacrylate copolymer (in Scheme 3 described below, described as "Poly(AEDPA-Boc-co-MMA)") was synthesized by Scheme 3. First, AIBN (azobisisobutyronitrile, 2 mol % with respect to the total amount of AEDPA-Boc and MMA on a molar basis) was placed as an initiator in a flask and the flask was replaced with Ar gas. Next, a solution obtained by dissolving AEDPA-Boc (500 mg, 1 equivalent) in 30 mL of isopropanol to obtain a mixed liquid. Next, a solution obtained by dissolving methyl methacrylate (418 mg, 4 equivalents) in 5 mL of isopropanol was added to the mixed liquid to obtain a reaction liquid. Next, the reaction liquid was heated to 80° C. and stirred for 10 hours for reaction. The reaction liquid after the reaction was added dropwise to an aqueous ethanol solution to precipitate a crude product (polymer). The obtained crude product was dried in a depressurized oven at 60° C. to obtain a white powdery product. The yield was about 70%.

Scheme 3

[Chemical Formula 18]

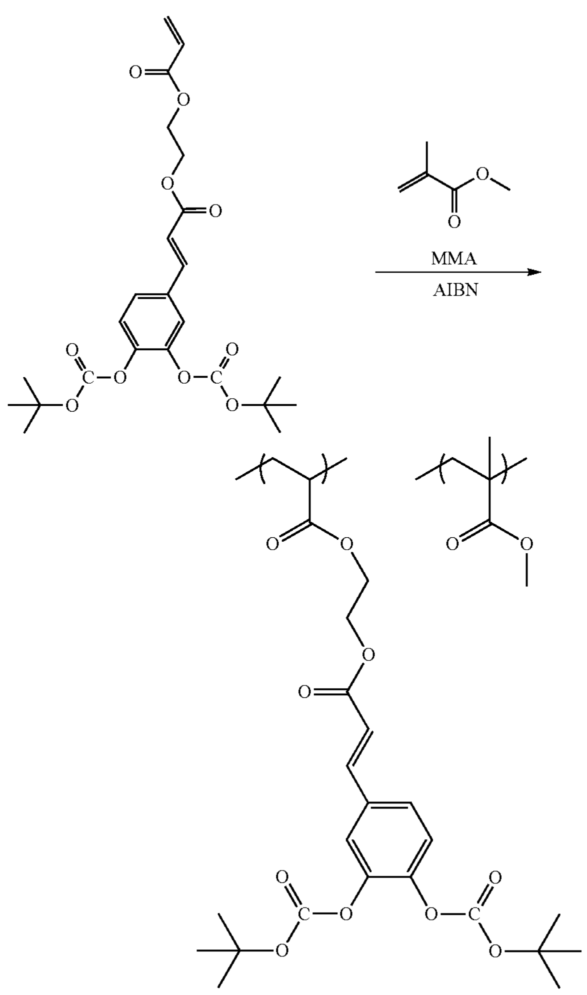

Poly(AEDPA-Boc-co-MMA)

(Synthesis of AEDPA/Methacrylate Copolymer)

Next, an AEDPA/methacrylate copolymer (in Scheme 4, described as Poly(AEDPA-co-MMA)) was synthesized by Scheme 4. First, the AEDPA-Boc/methacrylate copolymer was dissolved in a solution of trifluoroacetic acid (TFA)/tetrahydrofuran (THF) at a ratio of 1:1, and stirred at room temperature for 4 hours to obtain a mixed liquid. Next, the mixed liquid was added dropwise to water to precipitate a crude product. The crude product was filtered and dried in a depressurized oven at 60° C. to obtain a gray powdery product. The yield was 90%.

Scheme 4

[Chemical Formula 19]

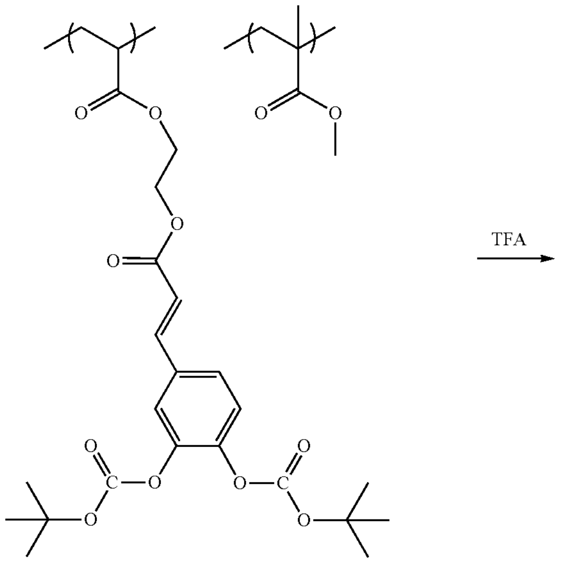

Poly(AEDPA-Boc-co-MMA)

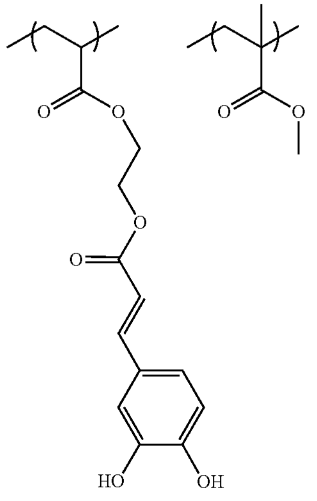

Poly(AEDPA-Boc-co-MMA)

Synthesis Example 2: Synthesis of Polymer Compound 11

AEDPA (500 mg, 1 equivalent), HMA (n-hexyl methacrylate, 1224 mg, 4 equivalents), and 2 mol % of AIBN with respect to the total amount of AEDPA and HMA on a molar basis were placed in a 50 mL flask, 10 mL of IPA was added thereto, and the mixture was bubbled with Ar gas for 20 minutes. The polymerization was performed at 75° C. under stirring at 400 rpm. After 3 hours, 1 mol % AIBN was further added with respect to the total amount of AEDPA and HMA on a molar basis. Thereafter, the polymerization was continued for 10 hours. The final mixture was precipitated in 100 mL of water, filtered, and dried to obtain 1.59 g of a polymer compound 11 (92%).

Examples 1 to 6: Synthesis of Polymer Compounds 1 to 6

Polymer compounds 1 to 6 were synthesized by the same method as in Synthesis Example 2 under the conditions described in Table 1, except that 2-ethylhexyl methacrylate (EHMA) was used instead of HMA. In Table 1, the "charging ratio" indicates the charging ratio (mol %) of AEDPA and a methacrylate monomer (described as "MA"), Mw and Mn indicate the weight average molecular weight and the number average molecular weight of the obtained polymer compound, and the "composition" means the content (mol %) of the AEDPA unit and the content (mol %) of the methacrylate unit in the obtained polymer compound.

In Table 1, the content of each unit in the polymer compound was measured using $^1$H-NMR. In Table 1, the weight average molecular weight and the number average molecular weight of the polymer compound were measured using gel permeation chromatography (GPC) under the following conditions.

Conditions: Measurement was performed in terms of polystyrene (PS) using Shodex GPC-101 equipped with a two-column system (Shodex KF-804L and Shodex KF-806L) in tetrahydrofuran (THF) at a flow rate of 0.8 mL/min at 25° C.

Examples 7 to 10 and 12: Synthesis of Polymer Compounds 7 to 10 and 12

Polymer compounds 7 to 10 and 12 were synthesized in the same manner as in Synthesis Example 2, except that ethyl methacrylate (described as "2C" in the table), n-propyl methacrylate (described as "3C" in the table), n-butyl methacrylate (described as "4C" in the table), pentyl methacrylate (described as "5C" in the table), and n-decyl methacrylate (described as "10C" in the table) were used instead of HMA (described as "6C" in the table). The composition of each polymer compound thus obtained is shown in Table 1.

Comparative Example: Synthesis of Comparative Compound

A comparative example compound was synthesized in the same manner as in Example 1, except that AEDPA-Boc was not used. The composition of the comparative example compound is collectively shown in Table 1.

[Evaluation 1: Adhesiveness]

The adhesiveness was evaluated by a shear strength test (lap shear test) using a superposed adhesive joint.

Aluminum (Al) substrates were treated according to the ASTM D2651 standard protocol, then fully dried, and immediately used for an adhesion test.

The size of the Al substrate was 100 mm×25 mm×2 mm, and a commercially available product manufactured by Standard Test Piece Co., Ltd. was purchased and used.

An adhesive composition was obtained by dissolving 200 mg of each polymer compound in 1.2 mL of acetone. Next, 100 μL of the adhesive composition was uniformly coated on the surface of the Al substrate and dried at 70° C. for 30 minutes. Next, two substrates were brought into contact with each other, cured at 80° C. for 1 hour at a pressure of 1 atm, and then cured at 60° C. for 1 hour to be completely dried.

During curing, a pair of metal clamps were fixed to the circumference of the overlapping contact area. Once cured, the sample was slowly cooled in air for about 30 minutes and a lap shear test was performed. The thickness of the adhesive coated between the Al—Al substrates was 0.09±0.01 mm.

The lap shear experiment was performed using an instrument with a 10000 N load cell attached to Shimadzu Autograph AG-X Plus. A crosshead speed of 1 mm/min was used in all cases.

TABLE 1

| | | Synthesis conditions and others | | | Polymer compound | | | | | |
|---|---|---|---|---|---|---|---|---|---|---|
| | | Charging ratio | | | | | | Composition | | |
| | | | MA | | | | | AEDPA unit | MA unit | Adhesion |
| | Polymer compound | AEDPA (mol %) | Type | Amount (mol %) | Mw ($\times10^4$) | Mn ($\times10^4$) | Mw/Mn | content (mol %) | content (mol %) | strength (MPa) |
| Example 1 | Polymer compound 1 | 5 | EHMA | 95 | 11.5 | 3.92 | 1.78 | 2 | 98 | 1.8 |
| Example 2 | Polymer compound 2 | 10 | EHMA | 90 | 10 | 2.74 | 3.67 | 4 | 96 | 3.9 |
| Example 3 | Polymer compound 3 | 15 | EHMA | 85 | 7.74 | 2.3 | 3.38 | 7 | 93 | 5.4 |
| Example 4 | Polymer compound 4 | 20 | EHMA | 80 | 5.6 | 1.7 | 3.33 | 9 | 91 | 4.5 |
| Example 5 | Polymer compound 5 | 30 | EHMA | 70 | 18.3 | 0.89 | 20.65 | 16 | 84 | 2.7 |
| Example 6 | Polymer compound 6 | 40 | EHMA | 60 | 20.6 | 0.65 | 31.74 | 21 | 79 | 2.3 |
| Example 7 | Polymer compound 7 | 20 | 2C | 80 | 16.2 | 1.07 | 15.1 | 12 | 88 | 0.8 |
| Example 8 | Polymer compound 8 | 20 | 3C | 80 | 17.1 | 1.99 | 8.6 | 9 | 91 | 1.6 |
| Example 9 | Polymer compound 9 | 20 | 4C | 80 | 5.49 | 1.3 | 4.21 | 9 | 91 | 1.8 |
| Example 10 | Polymer compound 10 | 20 | 5C | 80 | 7.78 | 1.19 | 6.54 | 9 | 91 | 3.2 |
| Example 11 | Polymer compound 11 | 20 | 6C | 80 | 11.5 | 3.44 | 3.35 | 9 | 91 | 4.4 |
| Example 12 | Polymer compound 12 | 20 | 10C | 80 | 6.89 | 1.33 | 5.18 | 9 | 91 | 3.7 |
| Comparative Example 1 | Comparative example compound | 0 | EHMA | 100 | 0.61 | 0.22 | 2.77 | 0 | 100 | 0.7 |

From the results shown in Table 1, the polymer compound of Example 3 (polymer compound 3) in which the unit based on AEDPA ("AEDPA unit", corresponding to the unit represented by Formula 1A) is 0.01 to 30 mol % when the total repeating units of the polymer compound was regarded as 100 mol % had an excellent adhesion strength when applied to an adhesive composition.

On the other hand, the polymer compound of Comparative Example 1 having no AEDPA unit did not have a desired adhesion strength.

The polymer compound 3 in which the content of the AEDPA unit was more than 2 mol % and 20 mol % or less had more excellent adhesion strength as compared with the polymer compound 1 and the polymer compound 6.

The polymer compound 3 in which the content of the AEDPA unit was 5 to 15 mol % had further excellent adhesion strength as compared with the polymer compound 2 and the polymer compound 5.

The polymer compound 11 in which the number of carbon atoms of the alkyl group represented by $R^4$ in Formula 2 is 1 to 10 had an excellent adhesion strength.

The polymer compound 11 in which the number of carbon atoms of the alkyl group represented by $R^4$ in Formula 2 is 3 to 10 had a more excellent adhesion strength as compared with the polymer compound 7.

The polymer compound 11 in which the number of carbon atoms of the alkyl group represented by $R^4$ in Formula 2 is 4 to 10 had a further excellent adhesion strength as compared with the polymer compound 8.

The polymer compound 11 in which the number of carbon atoms of the alkyl group represented by $R^4$ in Formula 2 is 5 to 10 had a particularly excellent adhesion strength as compared with the polymer compound 9.

[Evaluation 2: Adhesion between Polytetrafluoroethylene Substrates]

The polytetrafluoroethylene (PTFE) substrate had a size of 60 mm×20 mm×2 mm, and was polished with sandpaper (METSAPRP080240) before use, washed with water and acetone, and then used. An adhesive composition was prepared by dissolving 200 mg of the polymer compound 4 in 1.2 mL of acetone. Next, about 100 μL of this adhesive composition was applied onto the PTFE substrate and dried at 70° C. for 3 minutes. The applied surfaces of two PTFE substrates applied with the adhesive composition were opposed to each other, fixed with clips, and then heated at 80° C. for another one hour. Thereafter, the sample was slowly cooled at room temperature for about 30 minutes, and then subjected to a tensile shear test. The thickness of the adhesive composition layer applied between the PTFE substrates was 0.08±0.01 mm.

An adhesive composition containing the polymer compound 4 of Examples described below was prepared and two polytetrafluoroethylene substrates were bonded and deformed. The images when the substrates were deformed are shown in FIG. 2.

Figure 2:
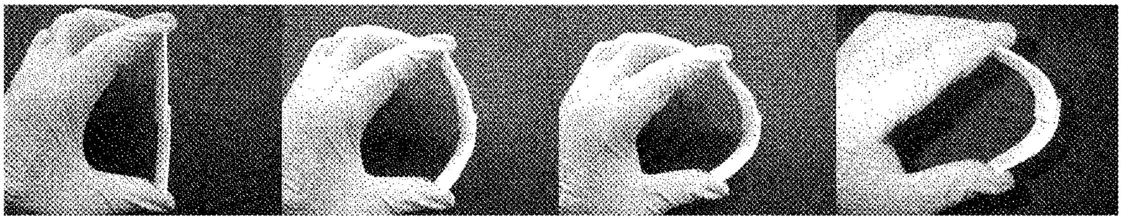
FIG. 2 shows images when an adhesive composition containing a polymer compound 4 of Examples described below was prepared and two polytetrafluoroethylene substrates were bonded and deformed.

As shown in FIG. 2, the polytetrafluoroethylene can be bonded to each other by using the adhesive composition containing the polymer compound 4.

[Ultraviolet Effect on Adhesion in Dry State]

Figure 3:
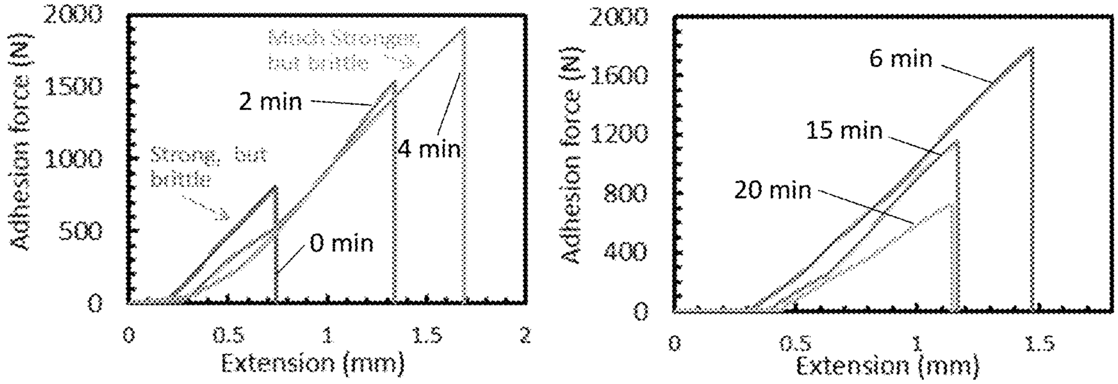
FIG. 3 is a view showing results of a lap shear test according to a $UV_{-H}$ irradiation time for Poly(AEDPA-co-EHMA) containing 15% of $C_{AEDPA}$.
Figure 4:
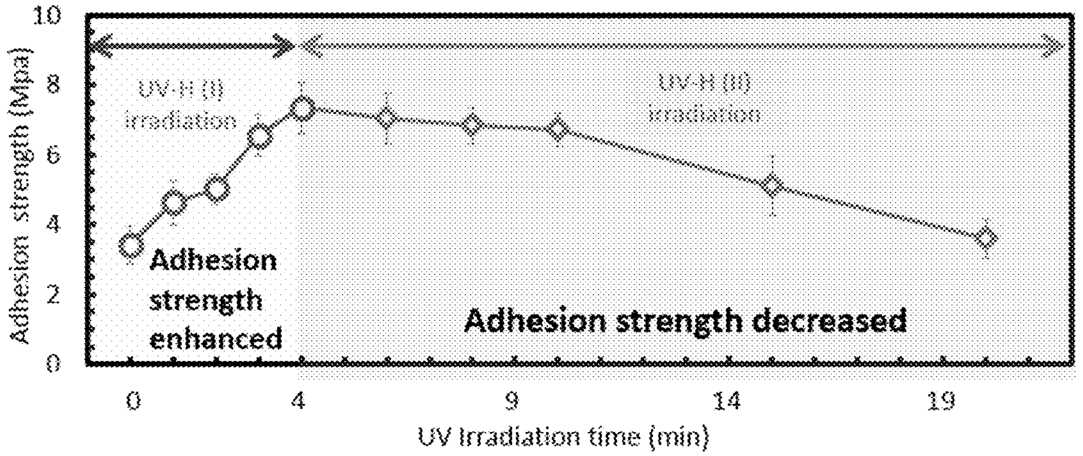
FIG. 4 shows the influence of the $UV_{-H}$ irradiation time on an adhesion force in which an adhesion strength is enhanced by $UV_{-H}$ irradiation (UV-H(I)) and the adhesion strength is decreased by further extension of $UV_{-H}$ irradiation (UV-H(II)). The optimal adhesion strength was obtained after 4 minutes of $UV_{-H}$(II) irradiation.

In consideration of the presence of a photosensitive site in the polymer compound described above, the influence of ultraviolet rays (UV) on the adhesion properties was examined (FIGS. 3 and 4). The measurement and evaluation of the adhesion force were performed on the basis of the evaluation of Examples described above.

As shown in FIG. 3, the adhesion strength of Poly (AEDPA-co-EHMA) with Mw=63500 before UV irradiation (0 min) showed a maximum load (Lmax) of about 810 N (corresponding to the adhesion strength of 3.40 MPa in FIG. 4). The Lmax of the adhesion force was increased to about 1210 N (corresponding to the adhesion strength of 4.63 MPa in FIG. 4) only by irradiating the bonding surface with $UV_{-H}$ for 1 minute, and increased to 1900 N (corresponding to the adhesion strength of 7.34 MPa in FIG. 4) after 4 minutes, and became 2.2 times or more the adhesion force before the UV treatment.

As described above, it was confirmed that light (ultraviolet rays) can significantly improve the adhesion properties of the polymer compound described above.

Figure 5:
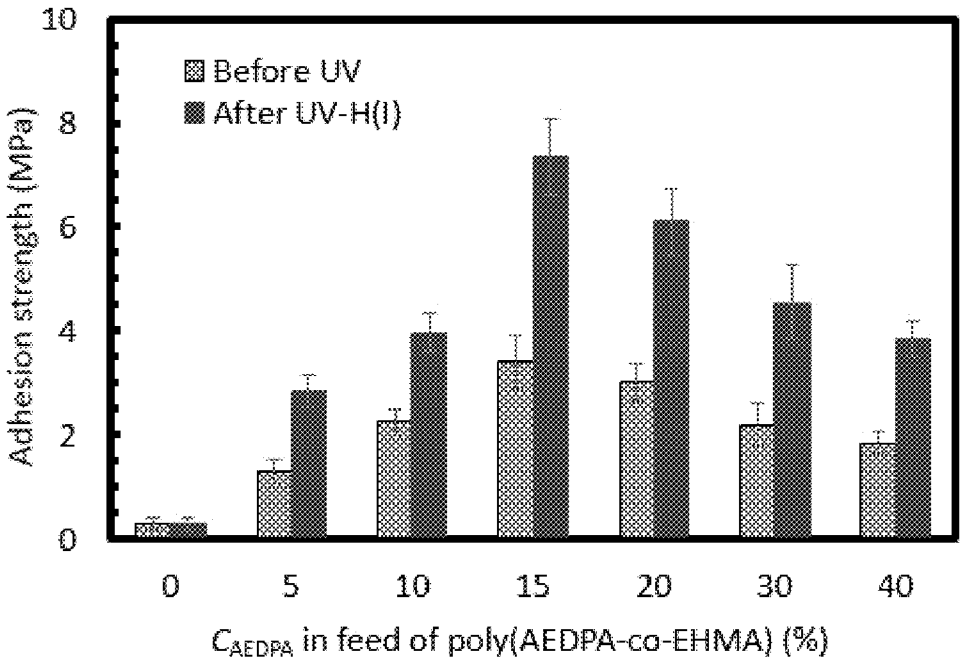
FIG. 5 is a view showing comparison of lap shear strengths of various copolymers in which the composition of $C_{AEDPA}$ was changed with respect to the influence of ultraviolet rays on the adhesion of Poly(AEDPA-co-EHMA) under dry conditions.

As shown in FIG. 5, as for the copolymers ($C_{AEDPA}$) each having a different content of the AEDPA unit, it was confirmed that the increased adhesion range of Poly(AEDPA-co-EHMA) having more than 20% of $C_{AEDPA}$ was smaller than the increased adhesion range of Poly(AEDPA-co-EHMA) having 15 to 20% of $C_{AEDPA}$.

Next, eight types of Poly(AEDPA-co-EHMA) having a low to high molecular weight were synthesized by controlling the amount of AIBN as an initiator during polymerization, and the influence of ultraviolet rays ($UV_{-H}$ irradiation) on the adhesion force was examined.

Figure 6:
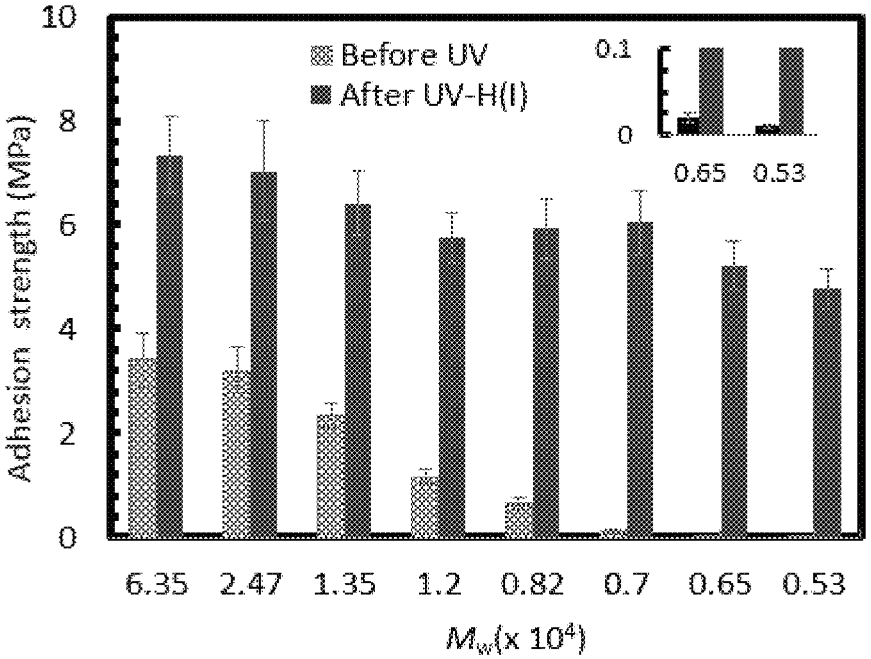
FIG. 6 is a view showing the influence of ultraviolet rays on the adhesion force of Poly(AEDPA-co-EHMA) having different Mw. $C_{AEDPA}$ was fixed at a concentration close to 8 to 9 mol % in all cases, and an aluminum substrate was used in a test.
Figure 7:
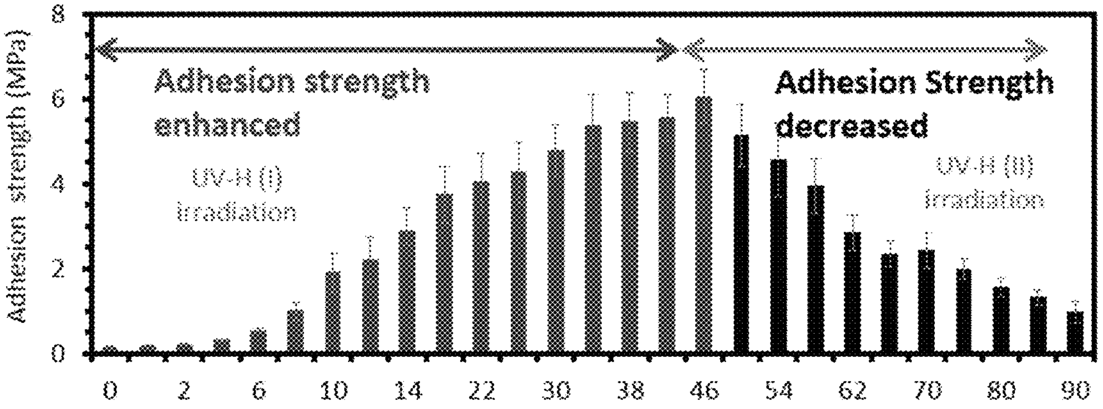
FIG. 7 is a view showing that, for Poly(AEDPA-co-EHMA), regarding the influence of the UV irradiation time on the adhesion strength, the adhesion strength is enhanced by irradiation with $UV_{-H}$(I) and the adhesion strength is decreased by UV-H(II). The optimal adhesion strength was obtained after about 46 minutes of the irradiation time of $UV_{-H}$(II).

The results are shown in FIG. 6. As shown in FIG. 6, it was confirmed that the ultraviolet rays greatly affected the adhesion force of Poly(AEDPA-co-EHMA). Specifically, for example, as shown in FIG. 7, in the case of a polymer having Mw≅7000, although the shear strength before light irradiation was 0.08 MPa, with an increase in the $UV_{-H}$ irradiation time, the adhesion strength gradually enhanced to 6.00 MPa, which was 60 times or more, after irradiation for 46 minutes, despite the fact that the adhesion force increase rate was slower in the irradiation for only 4 minutes than in the case of a polymer having Mw=$6.35\times10^4$.

It was confirmed that the fracture curve was smooth, was tough with excellent ductility, and was excellent in practicality.

Next, as shown in FIG. 6, the adhesion strength of the other seven kinds of polymers upon $UV_{-H}$ irradiation was examined. In a polymer having a molecular weight of $6.5\times10^3$, the adhesion strength was enhanced from 15 kPa to 5.0 MPa or more, which was about 300 times, by $UV_{-H}$ irradiation for about 80 minutes, whereas in a polymer having a molecular weight of $5.3\times10^3$, the adhesion strength was enhanced from 9 kPa to 5.0 MPa, which was about 500 times, by $UV_{-H}$ irradiation for about 120 minutes. The strong adhesion force due to the UV effect was very stable, and the separated aluminum plate could be bonded again only by heating the adhesive, and no fatigue was observed even in 20 cycle experiments, suggesting that the plate had excellent reusability and stability.

Figure 8:
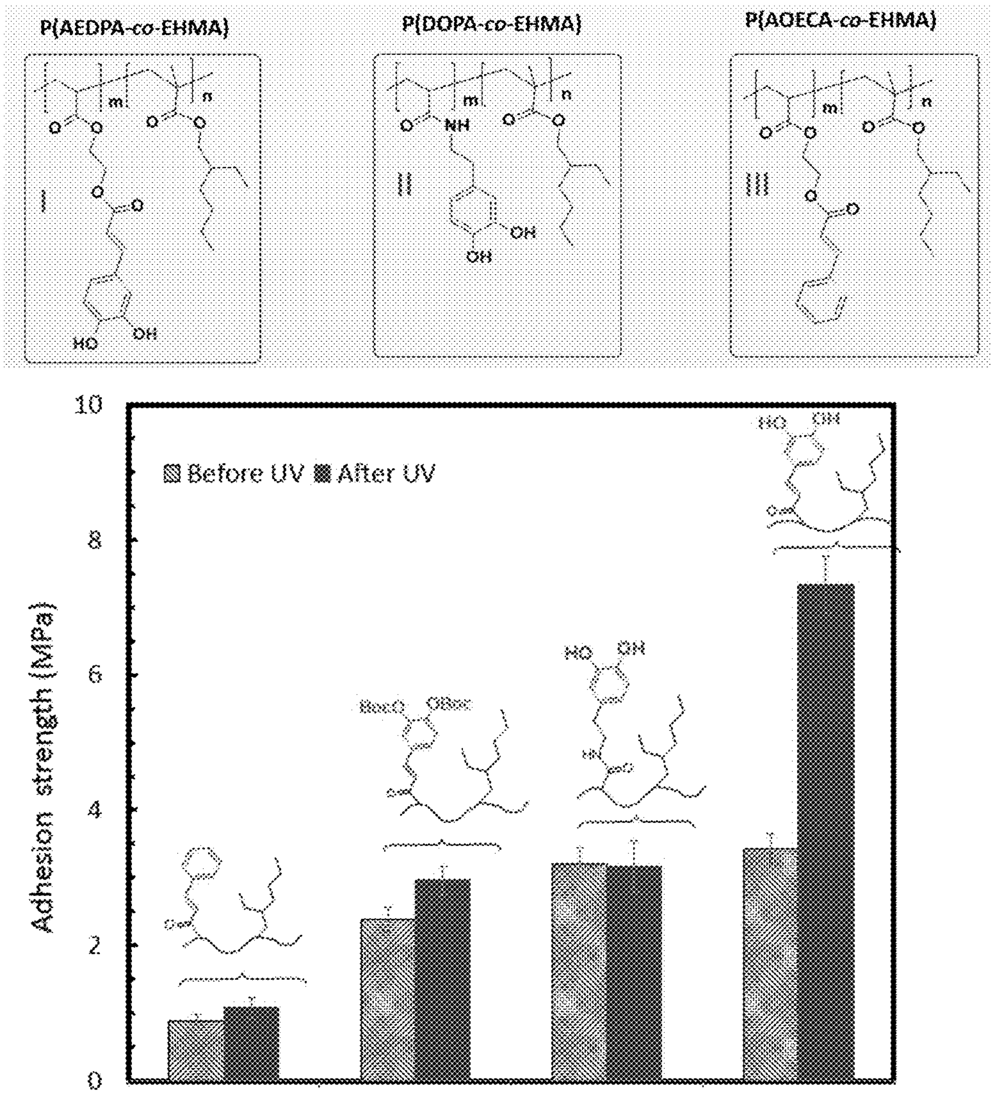
FIG. 8 is a view showing comparison of adhesion strengths of four types of polymers before UV irradiation and after UV irradiation.

To check whether these adhesion behaviors and enhanced adhesion are due to a catechol-containing photosensitive site (AEDPA), the adhesion properties were compared to the control sample shown in FIG. 8.

All samples kept the EHMA amount in the feed constant ($CE_{HMA}$=85%), and an Al substrate was used.

The adhesion strength of P(DOPA-co-EHMA) was 3.2 MPa similar to P(AEDPA-co-EHMA), but the value after UV irradiation was not changed, and it was confirmed that the catechol-containing photosensitive site (AEDPA) was important for increasing the UV adhesion strength. P(AE-OAC-co-EHMA) having no catechol site showed a breaking strength of 0.89 MPa, but the value after UV irradiation was much smaller than P(AEDPA-co-EHMA), suggesting that the catechol site is greatly involved in a large change in adhesion strength. In the polymer protected with catechol, a change in adhesion strength was hardly observed, suggesting that the free catechol group plays an important role in improvement in the adhesion strength. This is considered to be a result of the catechol group interacting with the substrate to form a H bond.

Various types of substrates were selected and the influence of ultraviolet rays on the adhesion properties of P(AEDPA-co-EHMA) was examined.

Figure 9:
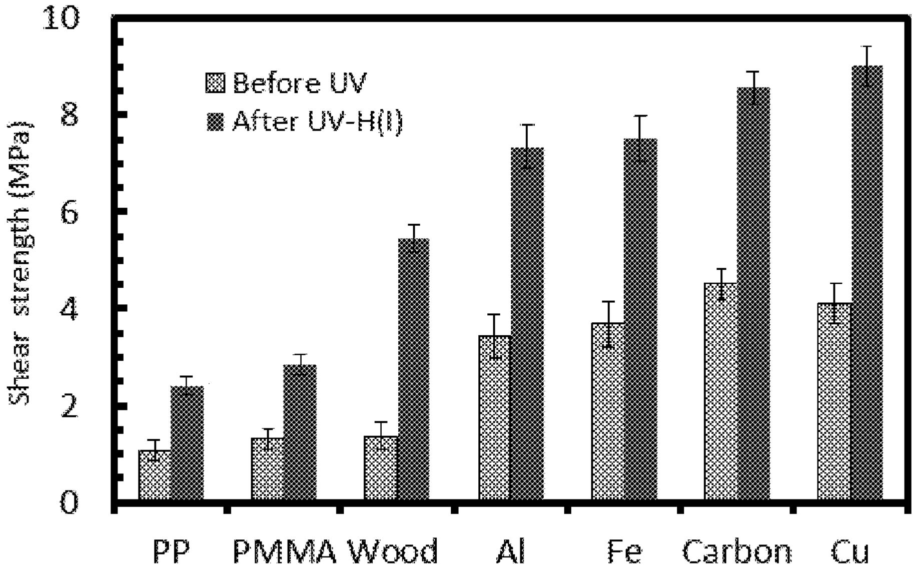
FIG. 9 is a view showing lap shear strengths of various substrates before and after $UV_{-H}$ irradiation in a dry state. All substrates were maintained under the same processing conditions and irradiated with UV until the lap shear strength reached the maximum value.

As shown in FIG. 9, after the bonding surface was irradiated with $UV_{-H}$, improvement in adhesion strength was observed for seven types of substrates. For example, the shear strength was improved from 4.12 MPa to 9.00 MPa or more for copper, from 4.51 MPa to 8.56 MPa for carbon, and from 1.38 MPa to 5.45 MPa for wood. Plastic is generally difficult to adhere with an adhesive having high adhesiveness, but it has been confirmed that an adhesive containing P(AEDPA-co-EHMA) exhibits remarkable adhesiveness, and the shear strength is greatly improved, for example, the adhesiveness with PMMA is improved from 1.30 MPa to 2.85 MPa particularly under light irradiation.

P(AEDPA-co-EHMA) exhibited excellent adhesiveness to the hydrophobic polypropylene surface, and the average shear strength was 2.41 MPa. From this, it was confirmed that the adhesive containing P(AEDPA-co-EHMA) can be used for adhesion of various materials, and the adhesion performance is greatly improved by the UV effect.

[UV Effect on Adhesion in Wet State/Water]

In practical applications, bonded substrate is exposed to a wet condition such as high humidity on rainy days. Therefore, there is a need for an adhesive that can be used under any conditions of a wet state/a state in water and a dry state.

Therefore, how light affects the adhesion strength by P(AEDPA-co-EHMA) under complex humidity environments such as different pH solutions and various metal ion conditions was examined.

Figure 10:
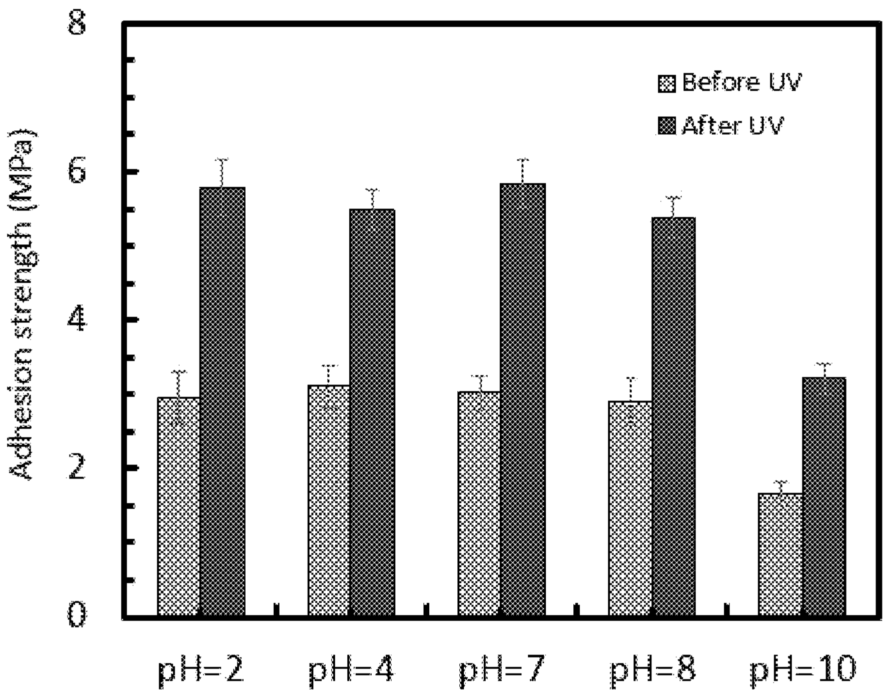
FIG. 10 is a view showing an effect of UV on the adhesion strength by Poly(AEDPA-co-EHMA) under a wet condition of pH 2 to 10. The wet state was achieved by applying an aqueous solution having a constant pH to the bonding surface.

FIG. 10 shows the influence of light ($UV_{-H}$ irradiation) on the adhesion strength by P(AEDPA-co-EHMA) in wet conditions at pH 2 to 10 where a wet environment is achieved by applying a specific pH solution to the bonding surface.

It was confirmed that the adhesion strength was strong at a low pH such as pH 2 to 7, and the adhesion strength exceeded 5 MPa after UV irradiation.

In different ion solutions containing NaCl, KCl, $CaCl_2$, $MgCl_2$, $ZnCl_2$, and $FeCl_3$, the adhesion strength of the adhesive (P(AEDPA-co-EHMA)) before and after $UV_{-H}$ irradiation was compared at a concentration of 1 M.

Figure 11:
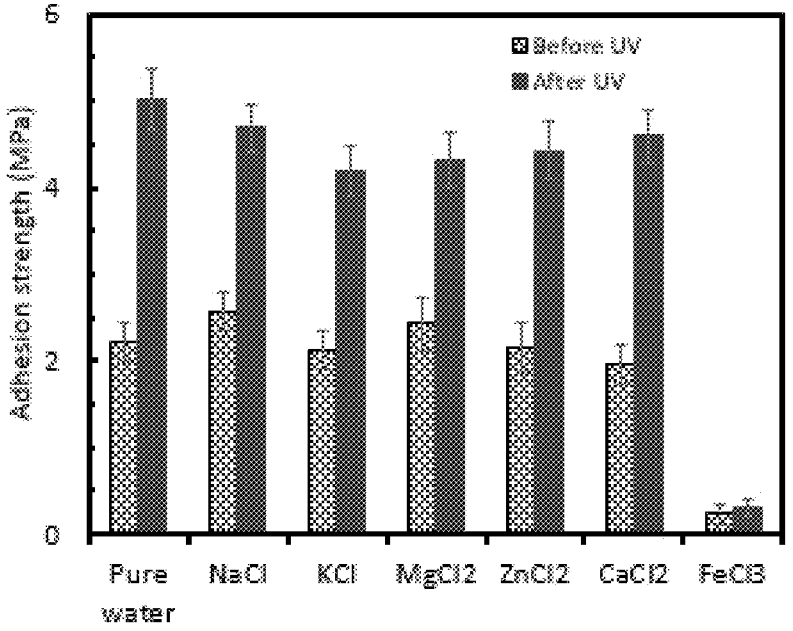
FIG. 11 is a view showing that, in different ion solutions containing NaCl, KCl, $CaCl_2$, $MgCl_2$, $ZnCl_2$, and $FeCl_3$, the adhesion strength of an adhesive (P(AEDPA-co-EHMA)) was compared at a concentration of 1 M.

The results are shown in FIG. 11. As shown in FIG. 11, the adhesion strength after $UV_{-H}$ irradiation in each ion solution was substantially the same value (4 to 5 MPa) in NaCl, KCl, $CaCl_2$, $MgCl_2$, $ZnCl_2$, and this was also significantly larger than that in the case of $FeCl_3$. In the solution containing $Fe^{3+}$ ions, it is considered that the decrease in wet adhesion force is caused by chemical bonding of $Fe^{3+}$ to the catechol group, followed by formation of Fe $(catechol)_3$ crosslinks.

For the adhesion strength of the adhesive P(AEDPA-co-EHMA) and the commercially available adhesive to various materials in water and the influence of light ($UV_{-H}$ irradiation), the shear strength on various surfaces was compared.

Figure 12:
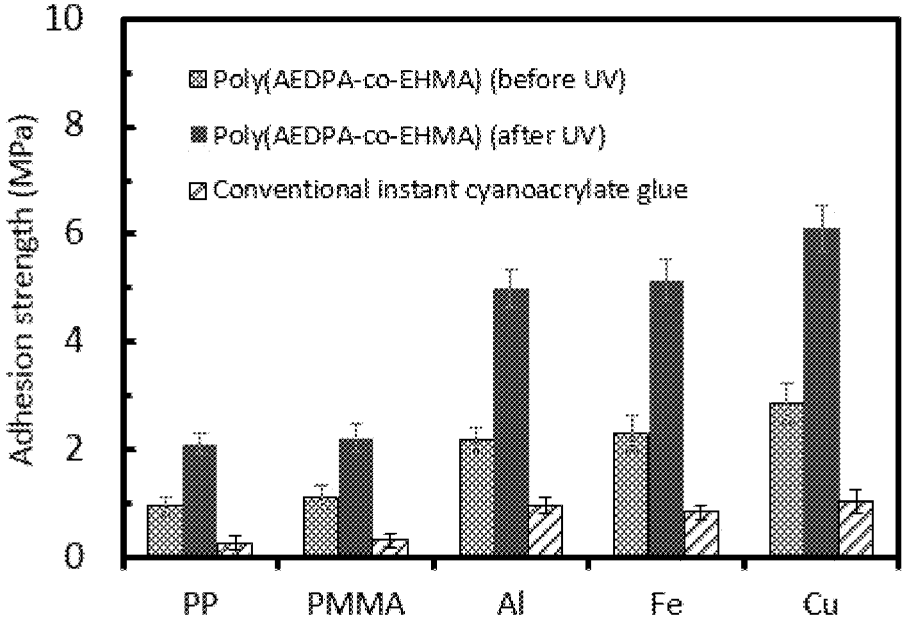
FIG. 12 is a view showing comparison of the shear strengths in various surfaces for the adhesion strength of an adhesive P(AEDPA-co-EHMA) having $C_{AEDPA}$=15% and a commercially available adhesive to various materials in water and the influence of light.

The results are shown in FIG. 12. As shown in FIG. 12, the adhesive (P(AEDPA-co-EHMA)) exhibited favorable adhesiveness to metals such as aluminum, iron, and copper, and plastics such as PP and PMMA. When the polymer was heated in water at 80° C., the polymer becomes semi-fluid and viscous. The viscous copolymer was stretched into a filament by slowly separating the two PP slides where the ends of the fibers were firmly attached to the substrate, suggesting that the viscous copolymer was very ductile.

The adhesion strength after $UV_{-H}$ irradiation was significantly increased from 2.00 MPa to 5 MPa for a steel substrate and from 1.00 to 2.00 MPa or more for PMMA. This indicates that the adhesion strength of various materials in a wet environment can be improved by utilizing light. It was confirmed that, as compared with a commercially available cyanoacrylate-based instantaneous adhesive, the cyanoacrylate-based instantaneous adhesive exhibited an adhesion strength of 0.98 MPa for an aluminum substrate, but these adhesives (P(AEDPA-co-EHMA)) exhibited clearly higher adhesion strength in five types of substrates, that is, 2.30 MPa or more in P(AEDPA-co-EHMA before ultraviolet ray irradiation, and 5 MPa or more in P(AEDPA-co-EHMA) after ultraviolet irradiation.

The adhesion strength of the adhesive (P(AEDPA-co-EHMA)) with respect to different materials in water and the influence of light ($UV_{-H}$ irradiation) were examined.

Figure 13:
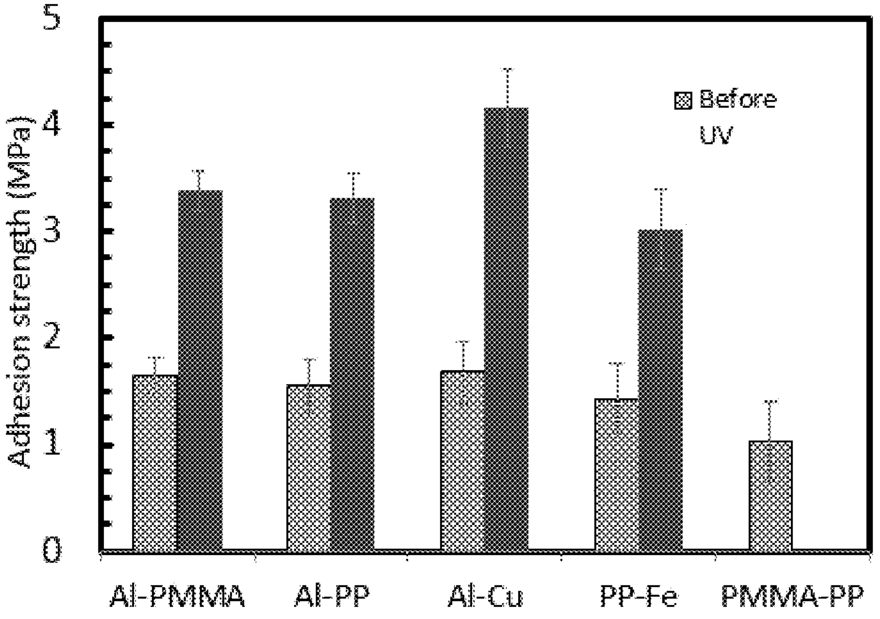
FIG. 13 is a view showing the adhesion strength of an adhesive (P(AEDPA-co-EHMA)) with respect to different materials in water and the influence of light.

The results are shown in FIG. 13. As shown in FIG. 13, the adhesive exhibited favorable adhesiveness to aluminum-PMMA, aluminum-PP, aluminum-copper, and PP-iron, and the adhesion strength was further increased by UV irradiation. It was confirmed that the adhesion strength of different materials in a wet environment can be improved by utilizing light (ultraviolet rays).

[Adhesion Reversibility]

The reversibility of the P(AEDPA-co-EHMA) adhesive was examined by switching the physical stimulation of ultraviolet irradiation.

Figure 14:
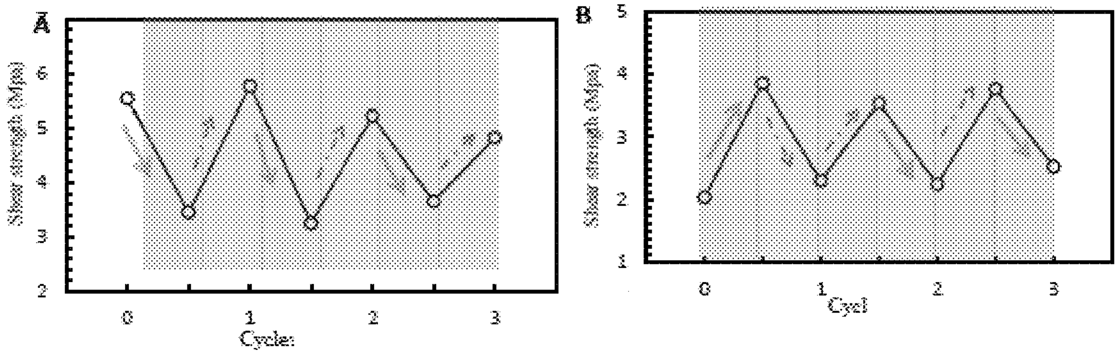
FIG. 14 is a view showing the reversibility of a P(AEDPA-co-EHMA) adhesive.

The results are shown in FIG. 14. As shown in FIG. 14, when the adhesive is irradiated with $UV_{-H}$ for 3 minutes, the adhesion strength between the two aluminum plates fixed with the adhesive reached 5.54 MPa. When the adhesive was irradiated with $UV_{-L}$ for 15 minutes, the adhesion strength was significantly decreased to 3.45 MPa. The decreased adhesion strength could be recovered by performing the subsequent high pressure light irradiation again for 3 minutes. By alternately irradiating the P(AEDPA-co-EHMA) adhesive with light having different wavelengths, it was possible to maintain effective switching of the adhesion force for at least three cycles.

Since the cross-linking density was increased and the adhesion force was decreased by long-time high ultraviolet irradiation ($UV_{-H}$(II) irradiation), the reversibility of the adhesion force was examined even by long-time high ultraviolet irradiation ($UV_{-H}$(II) irradiation). After irradiation with $UV_{-H}$(II) for about 15 minutes, the adhesion strength between the two aluminum plates fixed with the adhesive could achieve about 2.00 MPa. After the bonded adhesive was irradiated with $UV_{-L}$ for 30 minutes or longer, the adhesion strength was significantly increased to 3.85 MPa. When the adhesive with irradiated again with $UV_{-L}$ for 20 minutes, the adhesion strength was successfully recovered. Even by alternately irradiating the P(AEDPA-co-EHMA) adhesive with $UV_{-L}$ having different wavelengths, it was possible to maintain effective switching of the adhesion force for at least three or more cycles.

Figure 15:
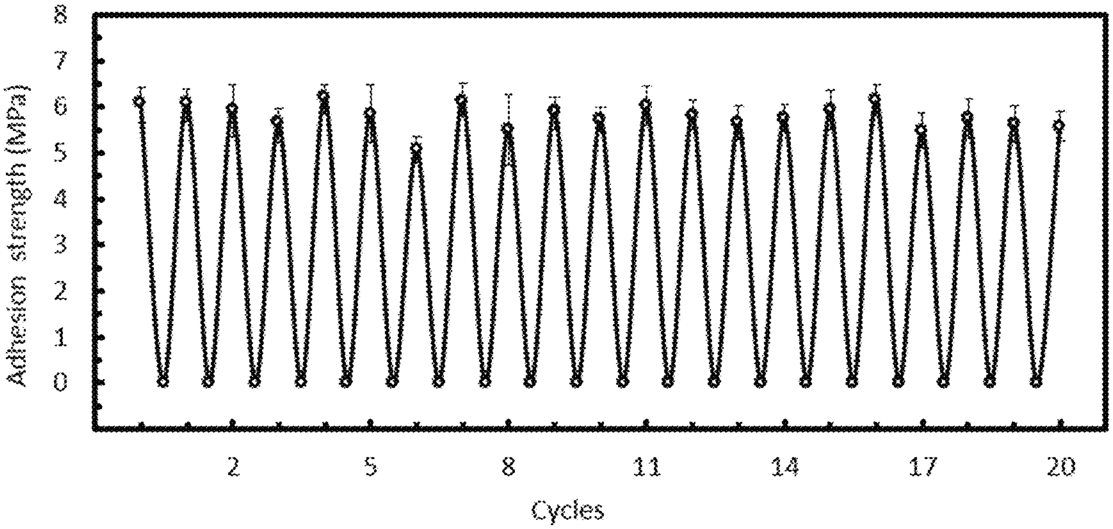
FIG. 15 is a view showing results of performing cycle experiments 20 times on a copolymer P(AEDPA-co-EHMA) containing 15% of $C_{AEDPA}$ and having Mw=7000.

As shown in FIG. 15, in the case of a copolymer P(AEDPA-co-EHMA) containing 15% of $C_{AEDPA}$ and having Mw=7000, even when cycle experiments of ultraviolet irradiation ($UV_{-H}$ and $UV_{-L}$) were performed 20 times, no change in apparent shear strength was observed, and stable reusability was exhibited.

Next, by adjusting the irradiation time and wavelength of ultraviolet rays, the self-control principle of muscle fibers was simulated, and whether application such as lifting different weights was possible was examined.

Figure 16:
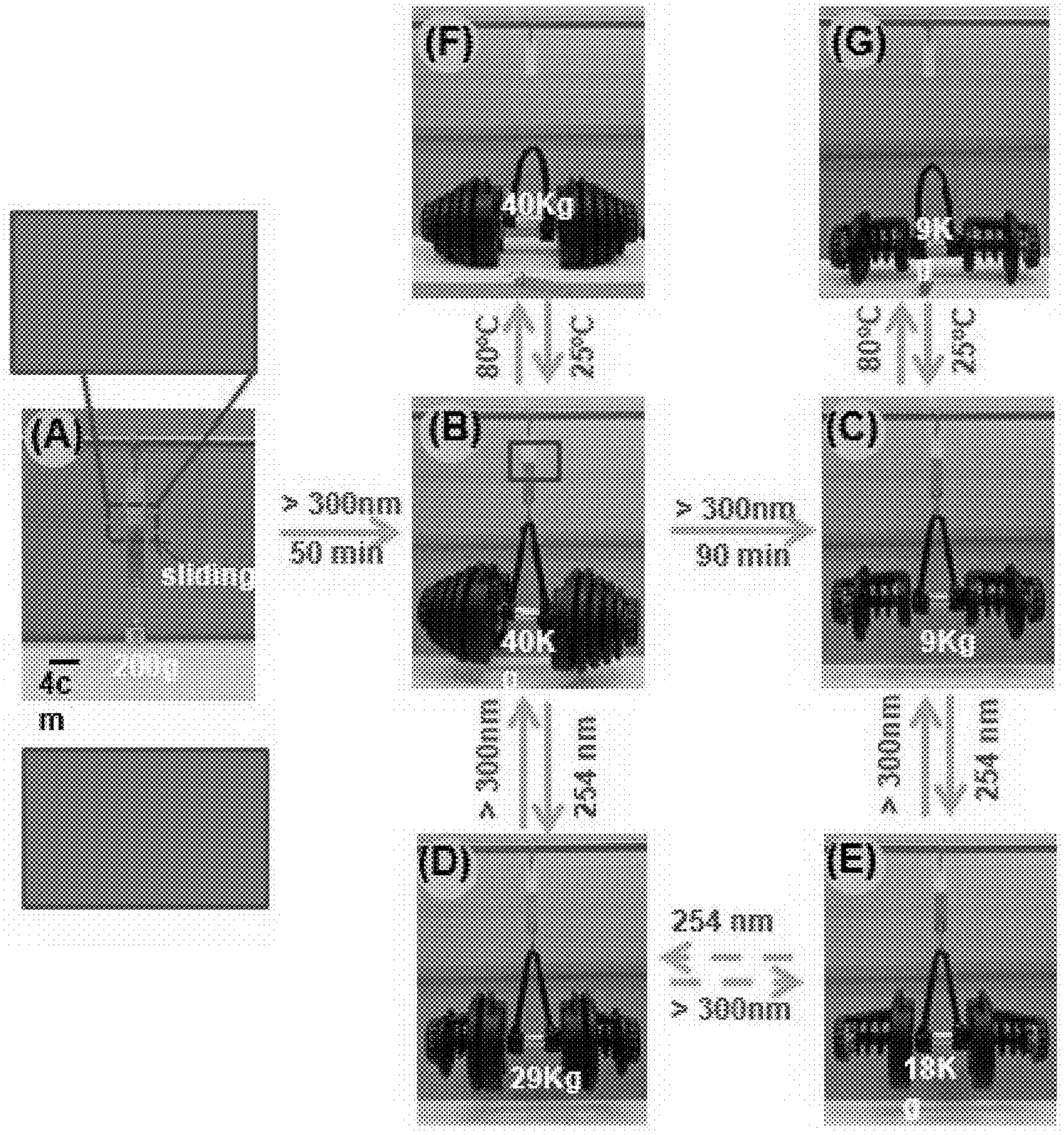
FIG. 16(A) shows a state in which a PP-Al substrate slides and falls when 200 g of a heavy object is lifted without UV irradiation.
FIG. 16(B) shows a state in which a 40 kg dumbbell could be easily lifted in the case of irradiation with $UV_{-H}$ for 50 minutes.
FIG. 16(C) shows a state in which only a 9 Kg or less dumbbell could be lifted even in the case of irradiation with $UV_{-H}$ for 40 minutes.
FIG. 16(D) shows a state in which the adhesion force to lift a weight was reduced to 29 Kg after the adhesive of (B) was irradiated with UV at 254 nm for 40 minutes, but a 40 Kg dumbbell could be lifted again after $UV_{-L}$ irradiation for 20 minutes.
FIG. 16(E) shows a state in which the adhesion force to lift an 18 Kg dumbbell could be switched by changing the $UV_{-H}$ irradiation to $UV_{-L}$ irradiation from (C).
FIG. 16(F) shows a state in which lift and place of a 40 Kg dumbbell could be switched between water heating at 80° C. and cooling in air.
FIG. 16(G) shows a state in which a 9 Kg dumbbell could be lifted and placed with 80° C. water heat and air cooling.

As shown in FIG. 16, two PP-Al substrates were bonded to each other with P(AEDPA-co-EHJMA) (15% AEDPA, Mw: about 6000) in an area of 2.5×3.0 cm. Although a weight of 200 g or less could be lifted in 0 cm and without irradiation with ultraviolet rays, in the case of irradiation with $UV_{-H}$ (λ>300 nm) for 10 minutes, a dumbbell of 2 kg could be lifted with the PP substrate, but in the case of irradiation with $UV_{-H}$ for 50 minutes, a dumbbell of up to 40 kg could be easily lifted. When the irradiation time of $UV_{-H}$ was extended to 90 minutes, a 9 Kg dumbbell could be lifted. However, when the irradiation time of $UV_{-H}$ is from 0 minutes to 50 minutes, the ability to lift a heavy object is greatly improved, and when the irradiation time is further extended, the ability to lift a heavy object is deteriorated.

In particular, In the case of using $UV_{-L}$ (A=254 nm), the reversibility of the adhesive is obtained. In the cases Ill to IV in which the ability to lift a 40 Kg weight was reduced to 29 Kg after 40 minutes of irradiation with $UV_{-L}$, when this adhesive was irradiated with $UV_{-H}$ for 20 minutes, the adhesion performance becomes significantly stronger, and a dumbbell of up to 40 Kg could be lifted again. The adhesive Ill having the ability to lift 9 kg was applied at 254 nm for 30 minutes, but the adhesion performance increased to the ability to lift about 18 kg. These phenomena suggest that the ability of the adhesive can be adjusted on demand by changing the irradiation time and wavelength, and play a role like a muscle capable of freely lifting different weights.

[Working Mechanism]

To clearly determine the mechanism of action of light-variable adhesion in dry/wet conditions, the thermodynamic and mechanical properties of the adhesive in response to UV triggers were then examined.

Figure 17:
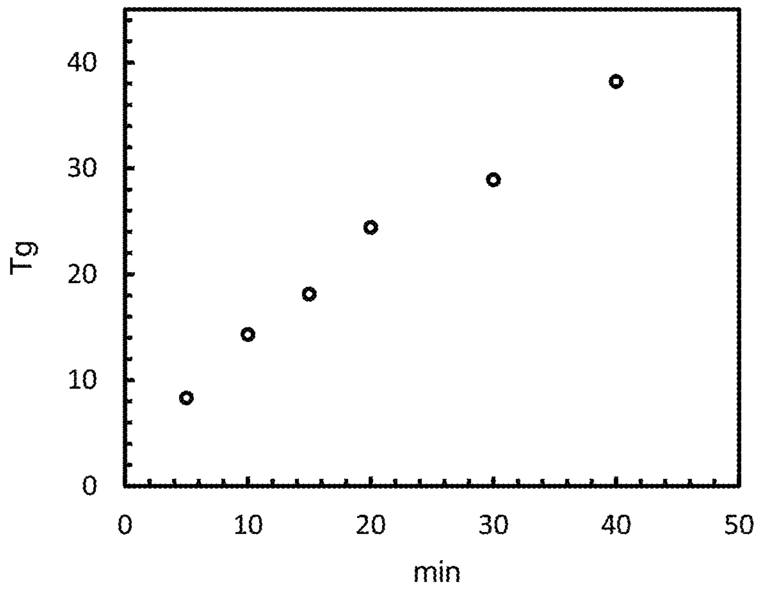
FIG. 17 is a view showing the influence of $UV_{-H}$ irradiation on $T_9$ (glass transition temperature) of P(AEDPA-co-EHMA) having a composition of $C_{AEDPA}$=15%.

FIG. 17 is a view showing the influence of $UV_{-H}$ irradiation on $T_9$ (glass transition temperature) of P(AEDPA-co-EHMA) having a composition of $C_{AEDPA}$=15%.

The $T_9$ after 20 minutes of $UV_{-H}$ irradiation increased from 18° C. to 27° C., and it became clear that UV increases the hardness of the adhesive. Regarding the increase in $T_g$, it was considered that a part of the linear polymer is bonded to a photosensitive site (a double bond site adjacent to $R^1$ in Formula 1A) due to a photocrosslinking effect to form a dimer, and a network structure is partially formed, so that the movement of the molecular chain segment is inhibited, thereby increasing the elastic modulus.

Figure 18:
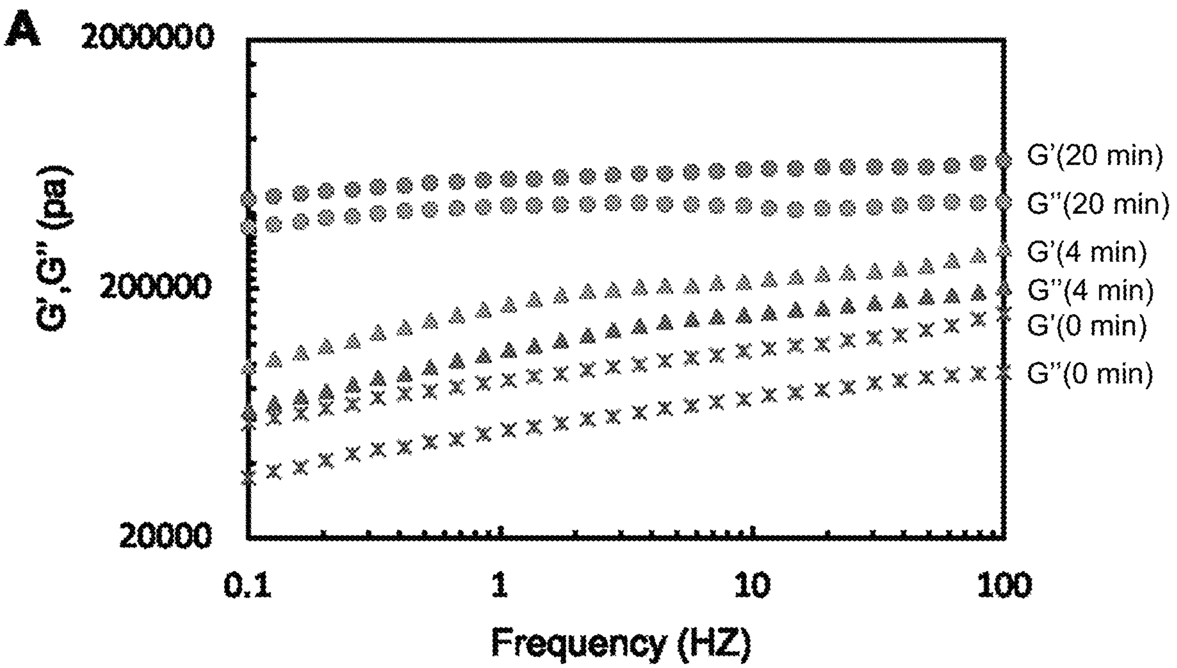
FIG. 18 is a view showing results of examining the elastic modulus property of P(AEDPA-co-EHMA) having a composition of $C_{AEDPA}$=15% by rheology analysis.

This elastic modulus property was examined by rheology analysis (FIG. 18). The storage modulus (G') was higher than the loss modulus (G") over the entire frequency range in all three poly(AEDPA-co-EHMA) samples, and the storage modulus (G') with UV irradiation for 20 minutes was increased by one digit.

The role of ultraviolet rays on the mechanical strength of poly(AEDPA-co-EHMA) was examined. As a result, it was confirmed that a crosslinking agent having strong covalency due to the cycloaddition reaction of caffeic acid had a large influence on the Young's modulus (FIG. 19).

Figure 19:
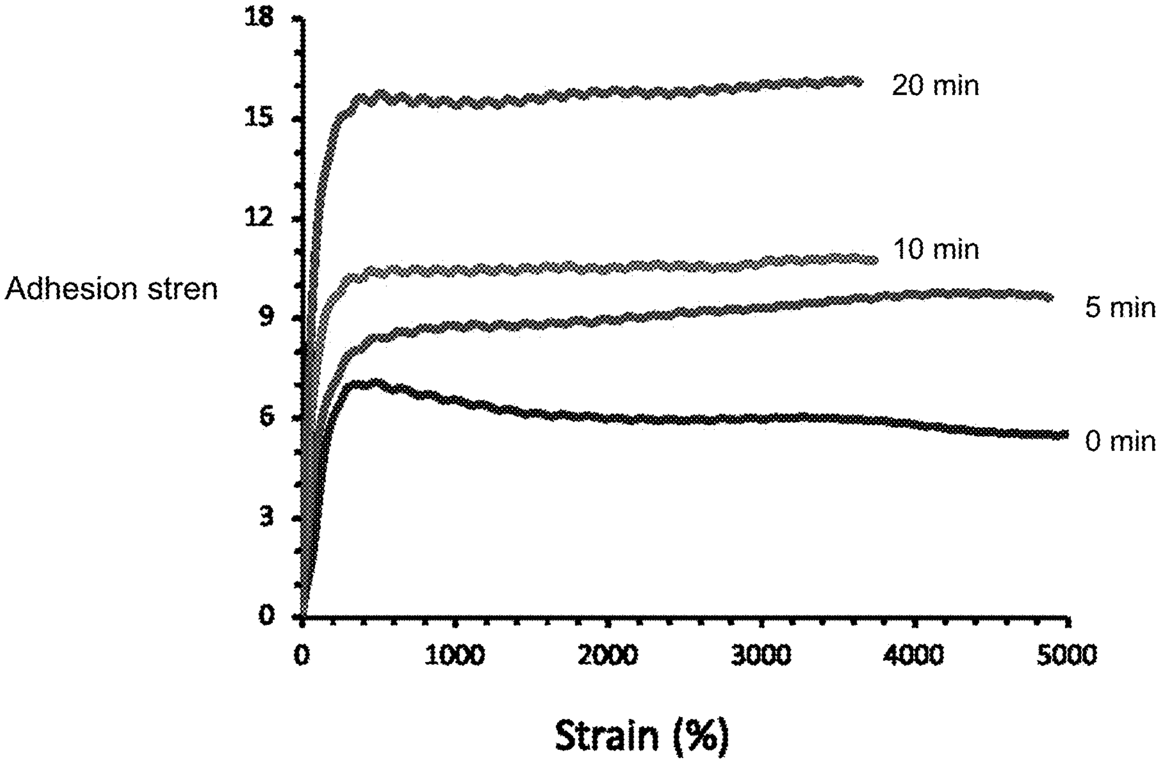
FIG. 19 is a view showing results of examining the influence of ultraviolet rays on the mechanical strength of poly(AEDPA-co-EHMA).

From the low strain region (strain of 20% or less) of the stress-strain curve in FIG. 19, the Young's modulus was 0.35 MPa, and the Young's modulus was increased to 1.0 MPa after 20 minutes of $UV_{-H}$ irradiation.

Figure 20:
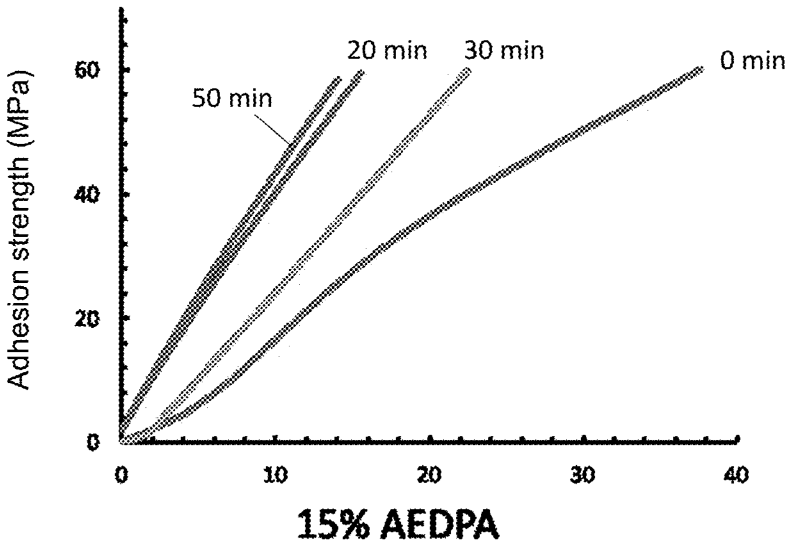
FIG. 20 is a view showing results of examining the influence of ultraviolet irradiation on Young's modulus for poly(AEDPA-co-EHMA).

It is considered that the stress-strain curve shows that the elastic region rises sharply first, and the elongation increases remarkably with the increase in strain, and then the stress gradually decreases, and thereafter, even if UV irradiation is performed, obvious stress reduction is not observed, and the energy dissipation of the polymer having no network is easy. The curve of the Young's modulus obtained by the compression method also tended to increase with ultraviolet irradiation (FIG. 20).

Figure 21:
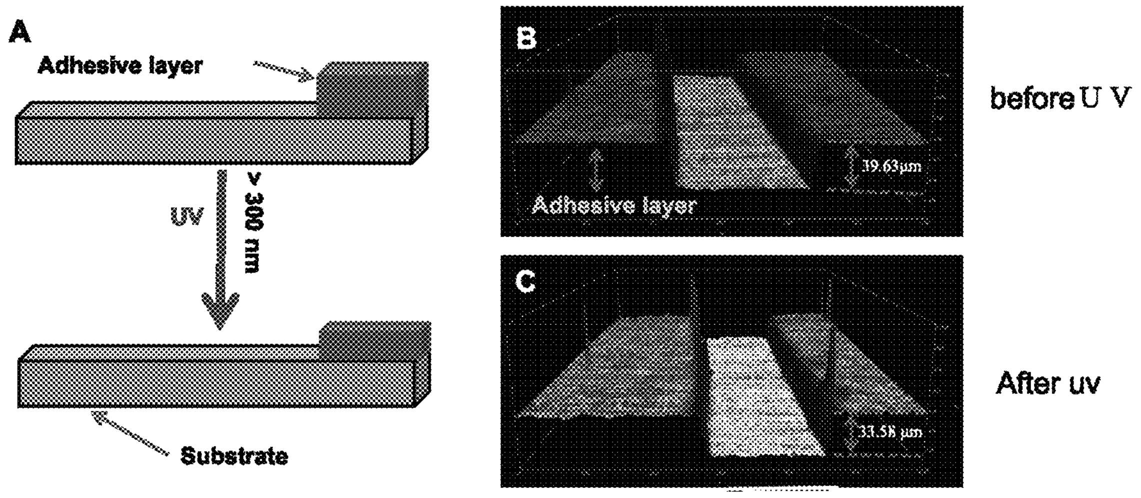
FIG. 21 is a view showing results of examining a change in thickness of an adhesive coating film before and after UV irradiation.

The change in thickness of the adhesive coating film before and after UV irradiation was examined. In the case of the adhesive being applied to an Al substrate having a thickness of 575 nm before UV irradiation, it was confirmed that the thickness decreased to 376 nm after 5 minutes of $UV_{-H}$ irradiation, and the volume of the adhesive layer decreased after UV irradiation (FIG. 21).

This decrease in volume leads to an increase in the number of catechols (catechol density) per unit area of the material surface adhering to the substrate, and is considered to contribute to improvement in adhesion strength.

In the case of irradiation with $UV_{-L}$ for 4 minutes or longer with respect to the case of irradiation with $UV_{-H}$ in advance within 4 minutes, the cross-linked covalent bond was partially cut, $T_9$s, and the elastic modulus and density of catechol were decreased, and the sticky force was decreased. On the other hand, it has been found that when an adhesive irradiated with $UV_{-H}$ having a much higher cross-linking density for 4 minutes is irradiated with $UV_{-L}$ for 4 minutes and then irradiated with $UV_{-L}$ for 4 minutes, the crosslinked covalent bond is partially broken and reduced, resulting in a decrease in $T_9$ and elastic modulus and an increase in adhesion force.

In an environment with a high humidity or an environment with a large amount of moisture, it is considered that water molecules exist on the surface of the adhesive in a free state or in a state in which oxygen is bonded to a hydrogen bond, and at the time of UV irradiation, crosslinking accompanied by volume shrinkage of the coating film occurs by $UV_{-H}$, and the hydrogen bond is broken by a contraction force so that the water molecules are driven out, and thereby the adhesion force gradually increases by light.

In this adhesive composition, the following mechanism and the like can be considered.

(i) The presence of a strong H-bond at the interface between a substrate and a catechol polymer chain improves the adhesiveness. (ii) The presence of an H-bond between molecules of a catechol polymer chain greatly improves the cohesive force. These H-bond interactions form the initial network-like structure, causing higher $T_9$ and a larger module. (iii) The covalent bond formation by cyclization under ultraviolet rays forms a double network-like structure and is stronger than that of a linear polymer.

The cross-linking density of the adhesive composition was determined according to the Flory-Rehner formula by applying the following formula to a sample swollen when immersed in water for 72 hours or longer.

[Chemical Formula 20]

$$V_T = -\frac{1}{2V_S}\frac{\ln(1-v_r)+v_r+\chi v_r^2}{v_r^{1/3}-v_r/2}$$

In this formula, $$V_r = \left(\frac{m_1}{\rho_1}\right)\Big/\left[\left(\frac{m_1}{\rho_1}\right)+\left(\frac{m_2}{\rho_2}\right),\right.$$

$m_1$ = Dry weight of sample, $\rho_1$ = Density of dried sample;

$m_2$ = Weight of solvent in swollen sample;

$\rho_1$ = Density of solvent.

$V_{s'}$ = Molar volume of water;

$x$ =

Interaction parameter between water and sample

It was confirmed that, in the adhesive composition, the cross-linking density in the case of irradiation with ultraviolet rays of 200 to 300 nm (preferably 220 to 270 nm) was 30% or less with respect to the cross-linking density in the case of irradiation with ultraviolet rays of 300 to 700 nm (preferably 300 to 450 nm).

More specifically, it was confirmed that, in the adhesive composition, the cross-linking density in the case of irradiation with ultraviolet rays of 300 to 700 nm (preferably 300 to 450 nm) was 10000 to 20000 mol/cm$^3$, and the cross-linking density in the case of irradiation with ultraviolet rays of 200 to 300 nm (preferably 220 to 270 nm) was 3000 to 6000 mol/cm$^3$.

As described above, the adhesive composition containing the dimer in which the double bond adjacent to $R^1$ in Formula 1A above is cleaved and bonded to each other forms a reversible H-bond in the catechol structure by UV, and the adhesion performance is improved. The adhesion strength thereof is comparable to that of a commercially available cyanoacrylate-based instant adhesive. As described above, the adhesive composition of the present invention has characteristics in that a strong adhesion strength can be achieved and the adhesion strength can be reversibly adjusted.

The invention claimed is:

1. An adhesive composition comprising a polymer compound, wherein the polymer compound has a repeating unit represented by Formula 1A below:

(1A)

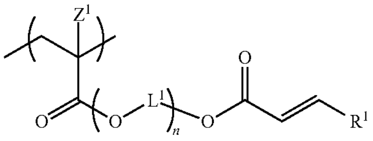

(1B')

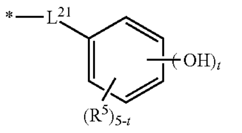

wherein in Formula 1A, $Z^1$ represents a hydrogen atom or a monovalent group, $R^1$ represents a group represented by Formula 1B', $L^1$ represents a divalent group, and n represents an integer of 1 or more, and in Formula 1B', $L^{21}$ represents a single bond or a divalent group, $R^5$ represents a hydrogen atom or a group represented by *—$OR^{31}$, * represents a bonding position, $R^{31}$ represents a hydrocarbon group which may have a hetero atom, a plurality of $R^{31}$'s may be bonded to each other to form a ring, t represents an integer of 2 or 3, and a plurality of $R^5$'s may be the same as or different from each other.

2. The adhesive composition according to claim 1, wherein the group represented by Formula 1B' above is at least one group selected from the group consisting of groups represented by Formulas 2b to 2d and 2g below when * is a bonding position (2b)

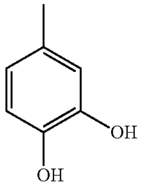

(2c)

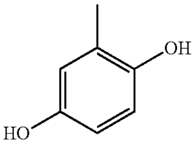

(2d)

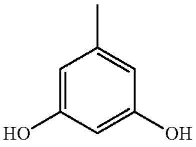

(2g)

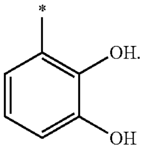

3. The adhesive composition according to claim 1, further having a repeating unit represented by Formula 2 below:

(2)

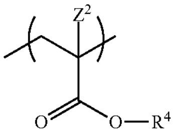

wherein in Formula 2, $Z^2$ represents a hydrogen atom or a monovalent group, and $R^4$ represents a monovalent organic group.

4. An adhesive composition comprising a polymer compound, wherein the polymer compound has a repeating unit represented by Formula 1A below:

(1A)

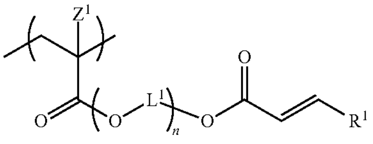

(1B)

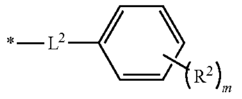

wherein in Formula 1A, $Z^1$ represents a hydrogen atom or a monovalent group, $R^1$ represents a group represented by Formula 1B, $L^1$ represents a divalent group, n represents an integer of 1 or more, and in Formula 1B, $L^2$ represents a single bond or a divalent group, $R^2$ represents a group selected from the group consisting of a hydroxy group and a group represented by

*—$OR^3$, $R^3$ represents a hydrocarbon group which may have a hetero atom, a plurality of $R^3$'s may be bonded to each other to form a ring, * represents a bonding position, m represents an integer of 1 to 5, and a plurality of $L^1$'s and a plurality of $R^2$'s may be the same as or different from each other, and wherein a content of the repeating unit represented by Formula 1A above is 30 mol % or less when a content of all repeating units of the polymer compound is regarded as 100 mol %.

5. An adhesive composition comprising a polymer compound, wherein the polymer compound has a repeating unit represented by Formula 1A below:

(1A)

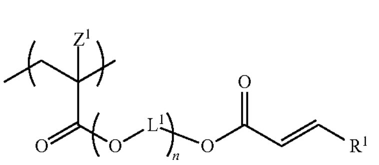

(1B)

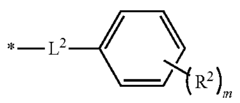

wherein in Formula 1A, $Z^1$ represents a hydrogen atom or a monovalent group, $R^1$ represents a group represented by Formula 1B, $L^1$ represents a divalent group, n represents an integer of 1 or more, and in Formula 1B, $L^2$ represents a single bond or a divalent group, $R^2$ represents a group selected from the group consisting of a hydroxy group and a group represented by *—$OR^3$, $R^3$ represents a hydrocarbon group which may have a hetero atom, a plurality of $R^3$'s may be bonded to each other to form a ring, * represents a bonding position, m represents an integer of 1 to 5, and a plurality of $L^1$'s and a plurality of $R^2$'s may be the same as or different from each other, and the adhesive composition comprises:

a monomer containing the polymer compound; and a dimer comprising two of the polymer compounds, wherein the two polymer compounds of the dimer are bonded to each other by cleavage of a double bond adjacent to $R^1$ in Formula 1A above.

6. The adhesive composition according to claim 5, wherein a cross-linking density is 10000 to 20000 mol/$cm^3$.

7. An adhesive composition comprising a polymer compound, wherein the polymer compound has a repeating unit represented by Formula 1A below:

(1A)

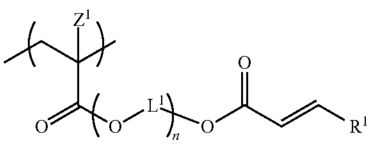

(1B)

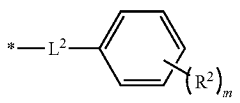

wherein in Formula 1A, $Z^1$ represents a hydrogen atom or a monovalent group, $R^1$ represents a group represented by Formula 1B, $L^1$ represents a divalent group, n represents an integer of 1 or more, and in Formula 1B, $L^2$ represents a single bond or a divalent group, $R^2$ represents a group selected from the group consisting of a hydroxy group and a group represented by *—$OR^3$, $R^3$ represents a hydrocarbon group which may have a hetero atom, a plurality of $R^3$'s may be bonded to each other to form a ring, * represents a bonding position, m represents an integer of 1 to 5, and a plurality of $L^1$'s and a plurality of $R^2$'s may be the same as or different from each other, and wherein a cross-linking density increases in the case of irradiation with ultraviolet rays of 300 to 700 nm, and a cross-linking density decreases in the case of ultraviolet rays of 200 to 300 nm after the irradiation with ultraviolet rays of 300 to 700 nm.

8. The adhesive composition according to claim 7, wherein the cross-linking density in the case of irradiation with ultraviolet rays of 200 to 300 nm is 30% or less with respect to the cross-linking density in the case of irradiation with ultraviolet rays of 300 to 700 nm.

9. The adhesive composition according to claim 7, wherein the cross-linking density in the case of irradiation with ultraviolet rays of 300 to 700 nm is 10000 to 20000 mol/cm3, and the cross-linking density in the case of irradiation with ultraviolet rays of 200 to 300 nm is 3000 to 6000 mol/$cm^3$.

10. A cured product obtained by curing the adhesive composition according to claim 1.

11. A method for producing the adhesive composition according to claim 1, the method comprising:

synthesizing a monomer A represented by Formula 5 below by an esterification reaction between a compound represented by Formula 3 below and a hydroxy group-containing (meth)acrylate compound represented by Formula 4 below; and polymerizing the monomer A to obtain the polymer compound:

(3)

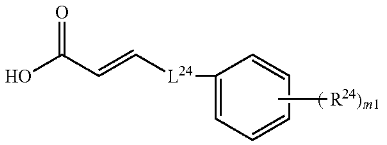

(4)

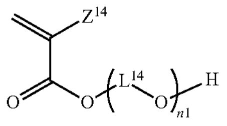

(5)

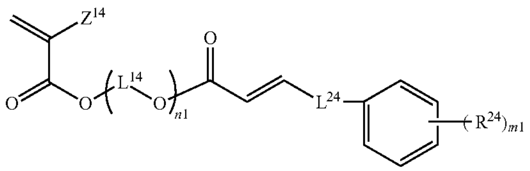

wherein in Formulas 3, 4, 5, $R^{24}$ represents a group selected from the group consisting of a hydroxy group and a group represented by *—$OR^{34}$, $R^{34}$ represents a hydrocarbon group which may have a hetero atom, * represents a bonding position, a plurality of $R^{34}$'s may be bonded to each other to form a ring, $Z^{14}$ represents a hydrogen atom or a monovalent group, $L^{14}$ represents a divalent group, $L^{24}$ represents a single bond or a divalent group, m1 represents an integer of 1 to 5, n1 represents an integer of 1 or more, and a plurality of $R^{24}$'s and a plurality of $L^{14}$'s may be the same as or different from each other.

12. A method for producing the adhesive composition according claim 1, the method comprising:

synthesizing a monomer B represented by Formula 5' below by an esterification reaction between a compound represented by Formula 3' below and a hydroxy group-containing (meth)acrylate compound represented by Formula 4' below;

reacting the hydroxy group of the monomer B with a protecting agent to synthesize a monomer C represented by Formula 6' having the protected hydroxy group;

polymerizing the monomer C to synthesize a polymer compound precursor represented by Formula 7'; and deprotecting the protected hydroxy group of the polymer compound precursor to obtain the polymer compound:

(3')

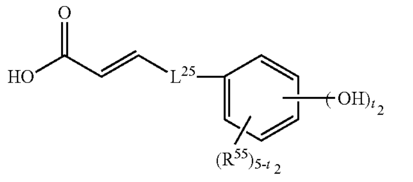

(4')

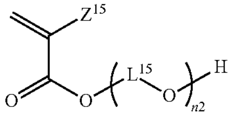

(5')

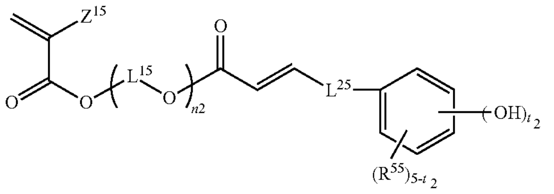

(6')

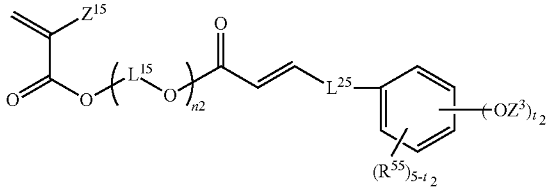

(7')

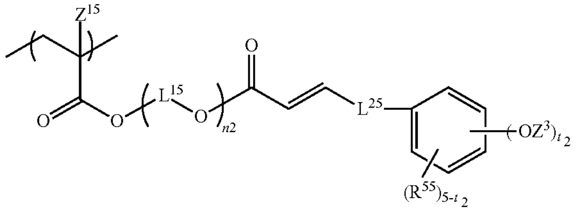

wherein in Formulas 3', 4', 5', 6', 7', $R^{55}$ represents a hydrogen atom or a group represented by *—$OR^{35}$, $R^{35}$ represents a hydrocarbon group which may have a hetero atom, * represents a bonding position, a plurality of $R^{35}$'s may be bonded to each other to form a ring, $Z^{15}$ represents a hydrogen atom or a monovalent group, $L^{15}$ represents a divalent group, $L^{25}$ represents a single bond or a divalent group, $Z^3$ is a protecting group of the hydroxy group, a plurality of $Z^3$'s may be bonded to each other to form a ring, n2 is an integer of 1 or more, $t_2$ is an integer of 2 to 3, a plurality of $R^{55}$'s, a plurality of $L^{15}$'s, and a plurality of $Z^3$'s may be the same as or different from each other.

13. A method for producing an adhesive composition according to claim 1, the adhesive composition comprising:

a monomer containing the polymer compound; and a dimer comprising two of the polymer compounds, wherein the two polymer compounds of the dimer are bonded to each other by cleavage of a double bond adjacent to $R^1$ in Formula 1A above, the method comprising a step of irradiating the adhesive composition according to claim 1 with ultraviolet rays.

14. A method for adjusting an adhesion force, the method comprising a step of irradiating the adhesive composition according to claim 1 with ultraviolet rays once or more.

15. The adhesive composition according to claim 1, wherein the polymer compound consists only of a repeating unit represented by Formula 1A above and a repeating unit represented by Formula 2 below:

(2)

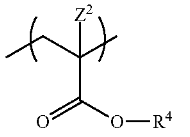

wherein in Formula 2, $Z^2$ represents a hydrogen atom or a monovalent group, and $R^4$ represents a monovalent organic group.

16. The adhesive composition according to claim 15, wherein the group represented by Formula 1B' above is at least one group selected from the group consisting of groups represented by Formulas 2b to 2d and 2g below when * is a bonding position (2b)

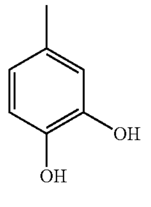

(2c)

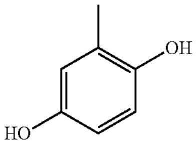

(2d)

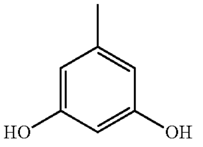

-continued
(2g)
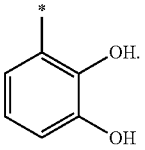
* * * * *